US007601274B2

(12) United States Patent
Mather et al.

(10) Patent No.: US 7,601,274 B2
(45) Date of Patent: Oct. 13, 2009

(54) SHAPE MEMORY MAIN-CHAIN SMECTIC-C ELASTOMERS

(75) Inventors: Patrick T. Mather, Chagrin Falls, OH (US); Ingrid A. Rousseau, Marlborough, MA (US); Haihu Qin, Columbus, OH (US)

(73) Assignee: The University of Connecticut, Storrs, CT (US)

( * ) Notice: Subject to any disclaimer, the term of this patent is extended or adjusted under 35 U.S.C. 154(b) by 798 days.

(21) Appl. No.: 11/096,021

(22) Filed: Mar. 31, 2005

(65) Prior Publication Data

US 2005/0242325 A1 Nov. 3, 2005

Related U.S. Application Data

(60) Provisional application No. 60/558,264, filed on Mar. 31, 2004.

(51) Int. Cl.
*C09K 19/00* (2006.01)
*C09K 19/06* (2006.01)
*C09K 19/52* (2006.01)

(52) U.S. Cl. .............................. 252/299.01; 252/299.6; 252/299.64; 430/20; 428/1.1

(58) Field of Classification Search ................... 430/20; 428/1.1; 252/299.01, 299.6, 299.64
See application file for complete search history.

(56) References Cited

U.S. PATENT DOCUMENTS

| | | | | |
|---|---|---|---|---|
| 4,920,191 | A | 4/1990 | Langer et al. | .................. 528/26 |
| 5,385,690 | A | 1/1995 | Finkelmann et al. | |
| 6,160,084 | A | 12/2000 | Langer et al. | |
| 6,312,770 | B1 * | 11/2001 | Sage et al. | ................... 428/1.1 |
| 6,388,043 | B1 | 5/2002 | Langer et al. | |
| 6,679,605 | B2 | 1/2004 | Zhou et al. | |
| 6,720,402 | B2 | 4/2004 | Langer et al. | |
| 7,208,550 | B2 * | 4/2007 | Mather et al. | ............... 525/199 |
| 2002/0065373 | A1 | 5/2002 | Krishnan | .................... 525/455 |
| 2004/0015187 | A1 | 1/2004 | Lendlein et al. | |
| 2004/0030062 | A1 | 2/2004 | Mather et al. | |

FOREIGN PATENT DOCUMENTS

| | | |
|---|---|---|
| EP | 0323742 A2 | 12/1988 |
| EP | 0367014 A2 | 10/1989 |
| WO | WO 01/40850 | 6/2001 |
| WO | WO 01/91822 | 12/2001 |

OTHER PUBLICATIONS

JP2003205496; Jul. 22, 2003; Abstract Only (2 pages).

B. Donnio et al., "A Simple and Versatile Synthetic Route for the Preparation of Main-Chain, Liquid-Crystalline Elastomers", Macromolecules 2000, vol. 33, pp. 7724-7729.

D. L. Thomsen III et al., "Liquid Crystal Elastomers with Mechanical Properties of a Muscle", Macromolecules 2001, vol. 34, pp. 5868-5875.

A. Lendlein et al., "Shape Memory Polymers", Angew. Chem. Int. Ed. 2002, vol. 41, pp. 2034-2057.

I. A. Rousseau et al., "Shape Memory Effect Exhibited by Smectic-C Liquid Crystalline Elastomers", Journal of the American Chemical Society 2003, vol. 125, pp. 15300-15301.

H. Qin et al., "Synthesis and Characterization of Unsaturated Thermotropic Polyesters Prepared via Acyclic Diene Metathesis Polymerizations", Macromolecules, vol. 37, No. 14, pp. 5239-5249 (2004).

I. A. Rousseau et al., "Shape Memory Effect in Smectic-C Liquid Crystalline Elastomers", Polymer Preprints (2004), 45(2), 81-82.

Liu, C. et al., "Chemically Cross-Linked Polycyclooctene: Synthesis, Characterization, and Shape Memory Behavior", Macromolecules 2002, 35, pp. 9868-9874.

http://www.siqmaaldrich.com/img/assets/3900/Photoinitiators.pdf (15 pgs).

Ingrid Rousseau , Development of Soft Polymeric Networks Showing Actuation Behavior: From Hydrogels to Liquid Crystalline Elastomers, Dissertation, University of Connecticut, 2004.

Joo et al., "Synthesis of Liquid Crystalline Polyesters of Various Types by Acyclic Diene Methathesis Polymerization", Macromolecules 2000, 33, pp. 6704-6712.

Rousseau et al., "Tailored Phase Transitions via Mixed-Mesogen Liquid Crystalline Polymers with Silicon-Based Spacers", Macromolecules 2005, 38, pp. 4103-4113.

Walba et al., "Main-Chain Ferroelectric Liquid Crystal Oligomers by Acyclic Diene Metathesis Polymerization", J. Am. Chem. Soc. 1996, 118, pp. 2740-2741.

Kim et al., "Effect of Molecular Weight on the Rheological Behavior of Thermotropic Liquid-Crystalline Polymer", Macromolecules 1993, 26, pp. 6633-6642.

U.S. Appl. No. 11/204,517, filed Aug. 16, 2005, Mather et al.

International Search Report for International Application No. PCT/US2005/011315. Mailed Sep. 26, 2005.

* cited by examiner

*Primary Examiner*—Geraldina Visconti
(74) *Attorney, Agent, or Firm*—Cantor Colburn LLP

(57) ABSTRACT

Shape memory main-chain smectic-C elastomers are described. The elastomers are prepared by hydrosilylation of a reaction mixture including a liquid crystalline diene, a crosslinking agent, and a bis(silyl hydride) compound. The elastomers exhibit shape-memory properties and spontaneously reversible shape changes. They are useful for fabrication of shape memory articles including, for example, implantable medical devices, contact lenses, reversible embossing media, and Fresnel lenses.

36 Claims, 12 Drawing Sheets

Figure 2. Reversible fingerprint embossing with a shape memory LCE.

Figure 3. DSC traces as a function of (a) mesogen composition, and (b) crosslinker concentration.

Figure 4. DSC traces as a function of mesogen composition for the E(x*4Me*/y*5Me*) elastomer series.

Figure 5. 2D WAXD patterns for (a) E(100*5tB*), (b) E(50*5H*/50*5tB*), (c) E(70*5H*/30*5tB*), (d) E(90*5H*/10*5tB*), (e) mesogen-free elastomer, (f) E(100*4Me*), (g) E(50*4Me*/50*5Me*), and (h) E(100*5Me*).

Figure 6. 2D WAXD patterns for stretched and unstretched samples of E(90*5H*/10*5tB*).

Figure 7. Shear storage modulus and tanδ data for E(x5H/y5tB) elastomers.

Figure 8. Shear storage modulus and tanδ data for E(x4Me/y5Me) elastomers.

Figure 9. Shape memory cycles of (a) E(50*5H*/50*5tB*), (b) E(70*5H*/30*5tB*), and (c) E(90*5H*/10*5tB*).

Figure 10. Shape memory cycles of (a) E(100*4Me*), and (b) E(100*5Me*).

Figure 11. Strain versus temperature plots for E(504Me/505Me) elastomer as a function of force.

SHAPE MEMORY MAIN-CHAIN SMECTIC-C ELASTOMERS

CROSS REFERENCE TO RELATED APPLICATIONS

This application claims the benefit of U.S. Provisional Patent Application Ser. No. 60/558,264, filed Mar. 31, 2004.

STATEMENT REGARDING FEDERALLY SPONSORED RESEARCH & DEVELOPMENT

This invention was developed with the support in whole or in part by National Science Foundation Grant No. CTS-00093880. The U.S. Government has certain rights in this invention.

TECHNICAL FIELD

This invention relates to shape memory liquid crystalline elastomers and more particularly to smectic-C liquid crystalline elastomers exhibiting shape memory effects and possessing low transition temperatures, optical transparency, and low tensile modulus.

BACKGROUND OF THE INVENTION

Shape memory has been observed to occur in polymers and alloys. While, for some shape memory polymers (SMPs) and shape memory alloys (SMAs), the observed shape memory and shape recovery rely on the crystallization behavior of the constituting material, for other SMPs, it is triggered by the glass transition temperature. SMPs are usually capable of undergoing very high (up to a few hundreds percent) and/or variable deformations but somewhat incomplete recovery, whereas SMAs usually exhibit complete recovery of somewhat much smaller deformations (up to 8%).

Side-chain liquid crystalline elastomers (LCEs) have also been widely studied because of their thermomechanical properties that include large strain reversible actuation and soft elasticity. The thermally stimulated actuation behavior is explained by a coupling between liquid crystalline order and rubber elasticity resulting from the underlying crosslinked structure.

Main-chain liquid crystalline polymers (MC-LCPs) have been studied less frequently than side-chain systems, presumably due to, in part at least, some unfavorable properties, i.e., high-phase transition temperatures (from mesophase to isotropic phase) and low solubility. Studies conducted with a MC-LCP slightly crosslinked by a reaction with $\alpha,\omega$-hydride terminated siloxane showed that cross-linking does not disturb the liquid crystalline phases, while the crosslinked sample showed rubber-like elasticity (K. H. Hanus et al., *Colloid Polymer Science*, 1990, 268, 222).

Higher actuator performance had been expected for main-chain liquid crystalline elastomers (MC-LCEs) due to an enhanced coupling between their intrinsically high, yet labile, ordering of the mesogenic units and network strain as compared to their side-chain analogues (P. G. de Gennes, *C. R. Acad. Sci. Ser. Iib: Mec., Phys., Astron.* 1997, 324, 343). Demonstration of the synthesis of one such MC-LCE was recently shown (B. Donnio et al, *Macromolecules*, 2000, 33, 7724 and references therein), but the product was not thermomechanically characterized.

Two salient properties of LCEs, namely, the phase transition temperature for the liquid crystalline phase (from mesophase to isotropic phase upon heating and the opposite direction upon cooling) and the elasticity of the crosslinked polymer network, make LCEs candidates for shape memory materials. Challenges exist, however, for main-chain liquid crystalline polymers due to their high transition temperatures and processing difficulties.

Shape memory materials require not only tailored transition temperatures (including for LCEs, isotropization), but also specific mechanical properties. To date, the syntheses of LCEs exhibiting capabilities as shape memory elastomers possessing low transition temperatures have not been achieved.

BRIEF DESCRIPTION OF THE INVENTION

It occurred to the inventors that MC-LCEs can be used as shape memory materials by taking advantage of the ordering of the liquid crystalline phase and elasticity of the polymer network. By varying the composition of the polymer main chain, the transition temperatures (from liquid crystalline phase to isotropic phase and mesogen phase softening) can be modified, particularly they can be lowered.

In one aspect of the invention, shape memory main chain smectic-C elastomers are provided. They can be processed initially into an equilibrium primary (permanent) shape, which, upon heating through the clearing transition (i.e. disordering of the network), can be deformed into a temporary, dormant shape. The latter can further be fixed and stabilized in its deformed state for extended periods of time by simply cooling below a combined clearing temperature and glass-transition (of mesogen-phase) temperature. The primary or permanent shape will be recovered only upon heating of the material above isotropization. In comparison with other shape memory rubbers, the shape memory smectic-C elastomers of the present invention feature a substantially lower stiffness (modulus) closer to that of a gel whereby very large and reversible deformations (ca. 400%) are possible.

In another aspect of the invention, high performance, shape memory liquid crystalline elastomers (SM-LCEs), where the triggering temperature corresponds to the isotropization temperature of the elastomer are provided. Compared to known SMPs or SMAs, these new materials have very low glass transition temperatures allowing both the primary and secondary shapes to exhibit low modulus (ca. 1-10 megaPascals (MPa)). Moreover, they can be processed into very thin films (on the order of a few hundred micrometers in thickness) that are optically transparent.

In another aspect of the invention, applications of and methods for the use of the SM-LCEs are provided as for example in the biomedical area, particularly for non-invasive medical applications where low modulus and low temperature shape memory materials are required. In addition the fact that the SM-LCEs of the invention are optically transparent is a very attractive quality for coatings of free-standing films of optical elements, such as lenses, shutters, etc. They are also very good candidates in the toy industry. In addition, their softness also imparts an excellent ability to be reversibly embossed for use as stamps and for surface replication.

DETAILED DESCRIPTION OF THE INVENTION

Figure 1:
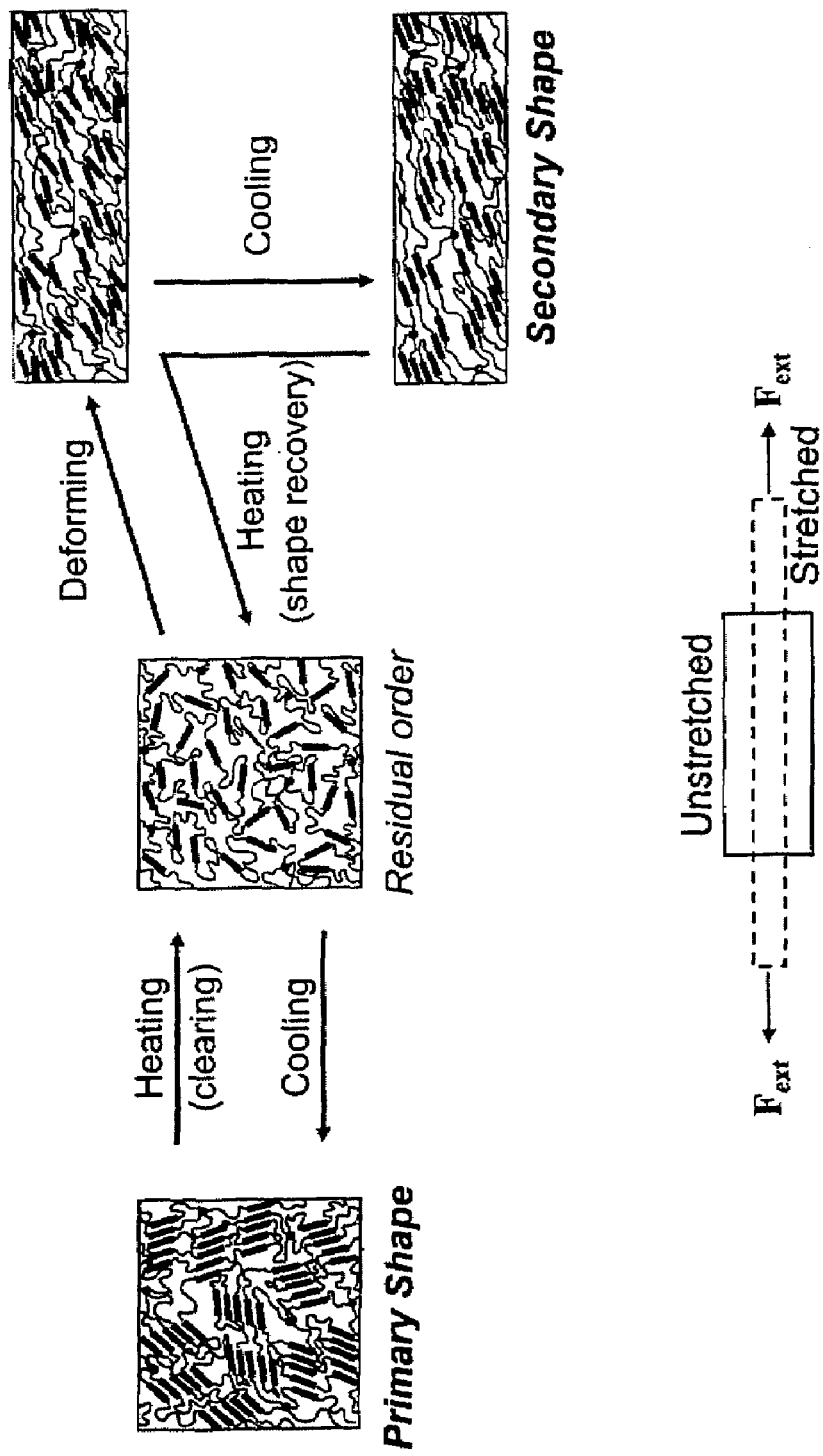
FIG. 1 illustrates the shape memory effect in smectic LCEs.

One embodiment is a shape memory main-chain smectic-C elastomer, consisting of the hydrosilylation product of a reaction mixture comprising: (a) a liquid crystalline diene having the structure specified below, (b) a polyvinyl crosslinking agent, and (c) a bis(silyl hydride) compound. The liquid crystalline diene (a) is alternatively described as a mesogen diene. A mesogen is a compound that under suitable conditions of temperature, pressure, and concentration can exist as a liquid crystalline phase. The elastomer is described as a "shape memory" elastomer because it exhibits either one-way or two-way shape memory behavior. In one-way shape memory behavior, a shape memory material may be distorted from its equilibrium position, fixed in the distorted position, and restored to its equilibrium position by heating. In two-way shape memory behavior, the shape memory material exhibits shape changes on both heating and cooling, for example contraction upon heating and expansion upon cooling. The elastomer is described as a "main chain" elastomer because it is a polymer that has mesogenic units in the main chain of the polymer. The elastomer is described as a "smectic-C" elastomer because the elastomer subunits derived from the liquid crystalline diene spontaneously arrange themselves in a stratified chevron structure where, locally, the mesogens within each mesogen-rich layer are tilted by an angle (e.g., 45°) relative to the layer normal. Such an arrangement can be confirmed and quantified by analysis of wide-angle x-ray diffraction patterns on mechanically oriented specimens. A characteristic feature of such patterns is the appearance of four off-meridian peaks in the smectic d-spacing region, here 3-4 nanometers, rather than two meridional peaks indicative of a smectic-A phase featuring no such mesogen tilting.

The liquid crystalline diene (a) has the structure wherein each occurrence of $R^1$ is independently selected from $C_1$-$C_{12}$ hydrocarbyl, $C_1$-$C_{12}$ hydrocarbyloxy, unsubstituted or substituted phenoxy, unsubstituted or substituted thiophenoxy, unsubstituted or substituted benzyl, unsubstituted or substituted benzoyl, unsubstituted or substituted phenyl sulfonyl, and unsubstituted or substituted phenyl sulfinyl; wherein n is 0 to 4; and wherein each occurrence of m is 1 to about 10. As used herein, the term "hydrocarbyl", whether used by itself, or as a prefix, suffix, or fragment of another term, refers to a residue that contains only carbon and hydrogen. The residue may be aliphatic or aromatic, straight-chain, cyclic, bicyclic, branched, saturated, or unsaturated. It may also contain combinations of aliphatic, aromatic, straight chain, cyclic, bicyclic, branched, saturated, and unsaturated hydrocarbon moieties. When phenoxy, thiophenoxy, benzyl, benzoyl, sulfonyl, and sulfinyl residues are referred to as "substituted", they may comprise one or more substituents that do not interfere with the synthesis or properties of the crosslinked polymer such as, for example, $C_1$-$C_6$ alkyl, $C_1$-$C_6$ alkoxy, halogen (including fluorine, chlorine, bromine, and iodine), hydroxyl, amino, $C_1$-$C_6$ alkylamino, $C_2$-$C_{12}$ dialkylamino, $C_2$-$C_{12}$ acyl, amido, $C_2$-$C_{12}$ alkylamido, $C_3$-$C_{12}$ dialkylamido, and the like. The variable "n", which is specified above as having a value of 0 to 4, may be 0, 1, 2, 3, or 4. The variable "m", which is specified above as having a value of 1 to about 10, may be at least 2 or at least 3; "m" may also be up to 8.

The polyvinyl crosslinking agent (b) is a crosslinking agent comprising at least three vinyl groups (i.e., at least three —CH=$CH_2$ groups). Suitable polyvinyl crosslinking agents include, for example, tetrakis(vinyldimethylsiloxy)silane, tris(vinyldimethylsilyloxy)methylsilane, bis(vinyldimethylsilyl)benzene, and combinations thereof. In one embodiment, the polyvinyl crosslinking agent is tetrakis(vinyldimethylsiloxy)silane. The amount of the polyvinyl crosslinking agent in the reaction mixture may be about 2 to about 30 mole percent, based on moles of the liquid crystalline diene. Within this range, the polyvinyl crosslinking agent amount may be at least about 5 mole percent, or up to about 20 mole percent. A preferred polyvinyl crosslinking agent amount is about 10 mole percent.

The bis(silyl hydride) compound (c) is a compound having two silyl hydride groups (i.e., two Si—H groups). Suitable bis(silyl hydride) compounds include 1,4-bis(dimethylsilyl)benzene, silyl hydride-terminated amorphous polymers having a glass transition temperature less than or equal to 0° C., and hydride-terminated poly(dimethylsiloxane)s having the structure

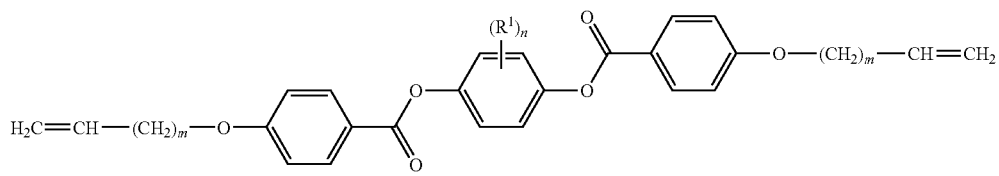

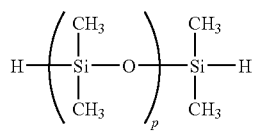

wherein p is 1 to about 12. In the hydride-terminated poly(dimethylsiloxane) structure above, p may be at least 2 or at least 4; p may also be up to 7 or up to 5. In one embodiment, p is 7. When the bis(silyl hydride) compound is a silyl hydride-terminated amorphous polymer, it may have a glass transition temperature less than or equal to 0° C., or less than or equal to −10° C., or less than or equal to −20° C. Silyl hydride-terminated amorphous polymers include, for example, silyl hydride-terminated poly(cis-butadiene), and silyl hydride-terminated poly(styrene-co-butadiene), each with degrees of polymerization from about 2 to about 12. The amount of the bis(silyl hydride) compound is specified based on the mole ratio of hydride functionality in the bis(silyl hydride) compound to total vinyl functionality in the liquid crystalline diene and the crosslinking agent. That ratio may be about 0.9 to about 1.10. Within this range, the ratio may be at least about 0.95. Also within this range, the ratio may be up to about 1.05. In one embodiment, the ratio is about 1.0.

In one embodiment, the liquid crystalline diene comprises a first liquid crystalline diene having the structure

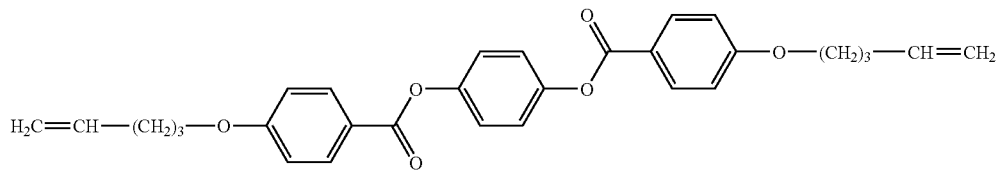

and a second liquid crystalline diene having the structure

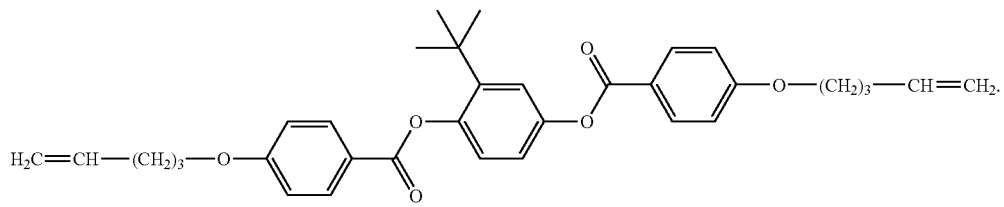

In this embodiment, the liquid crystalline diene may comprise about 10 to about 99 weight percent of the first liquid crystalline diene and about 1 to about 90 weight percent of the second liquid crystalline diene, based on the total weight of the liquid crystalline diene. Within these ranges, the first liquid crystalline diene amount may be at least about 20 weight percent, or at least about 40 weight percent; the first liquid crystalline diene amount may be up to 90 weight percent, or up to 80 weight percent. Also within these ranges, the second liquid crystalline diene amount may be at least about 10 weight percent, or at least about 20 weight percent; the second liquid crystalline diene amount may be up to about 80 weight percent, or up to about 60 weight percent.

In another embodiment, the liquid crystalline diene comprises a first liquid crystalline diene having the structure

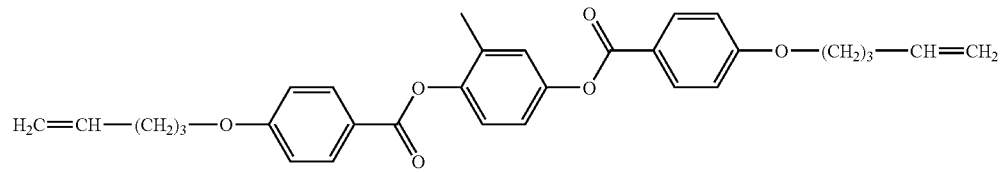

and a second liquid crystalline diene having the structure

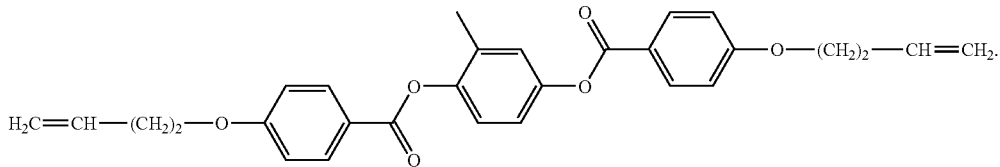

In this embodiment, the reaction mixture may comprise about 1 to about 99 weight percent of the first liquid crystalline diene and about 1 to about 99 weight percent of the second liquid crystalline diene, based on the total weight of the first liquid crystalline diene and the second liquid crystalline diene. Within these ranges, the first liquid crystalline diene amount may be at least about 10 weight percent, or at least about 20 weight percent; the first liquid crystalline diene amount may be up to about 90 weight percent, or up to about 80 weight percent. Also within these ranges, the second liquid crystalline diene amount may be at least about 10 weight percent, or at least about 20 weight percent; the second liquid crystalline diene amount may be up to about 90 weight percent, or up to about 80 weight percent.

One embodiment is a shape memory main-chain smectic-C elastomer consisting of the hydrosilylation product of a reaction mixture comprising: (a) a liquid crystalline diene having the structure specified below, (b) a polyvinyl crosslinking agent, and (c) a bis(silyl hydride) compound; wherein the liquid crystalline diene comprises 1,4-bis[4-(4-pentenyloxy)benzoyl]hydroquinone and 2-tert-butyl-1,4-bis[4-(4-pentenyloxy)benzoyl]-hydroquinone; wherein the crosslinking agent is tetrakis(vinyldimethylsiloxy)silane; and wherein the bis(silyl hydride) compound has the structure

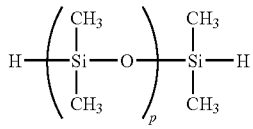

wherein p is 7. In this embodiment, the shape memory main-chain smectic-C elastomer may exhibit a one-way shape memory effect.

One embodiment is a shape memory main-chain smectic-C elastomer consisting of the hydrosilylation product of a reaction mixture comprising: (a) a liquid crystalline diene having the structure specified below, (b) a polyvinyl crosslinking agent, and (c) a bis(silyl hydride) compound; wherein the liquid crystalline diene comprises 2-methyl-1,4-bis[4-(4-pentenyloxy)benzoyl]-hydroquinone and 2-methyl-1,4-bis[4-(4-butenyloxy)benzoyl]-hydroquinone; wherein the crosslinking agent is tetrakis(vinyldimethylsiloxy)silane; and wherein the bis(silyl hydride) compound has the structure

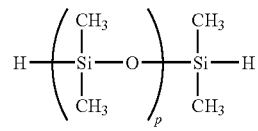

wherein p is 7. In this embodiment, the shape memory main-chain smectic-C elastomer may exhibit a two-way shape memory effect.

The synthesis of the elastomers of the invention is an extension of the well-known platinum-catalyzed hydrosilylation reaction. It uses flexible siloxanes, rigid rod-like liquid crystalline dienes, and silicon-based crosslinkers. The thermomechanical properties of the resulting crosslinked films can be easily tuned by varying their chemical composition. For the shape memory effect (specifically one-way shape memory) to be observed, the achievement of a smectic-C phase with closely overlapping mesogen-phase $T_g$ and smectic-C isotropization, but with $T_g$ slightly lower, appears to be necessary. Varying the composition of the elastomers allows for the smectic-C character to be conserved, but for the isotropization temperature to be varied in a controlled manner. In accordance with the invention shape memory smectic-C elastomers with critical temperatures ranging from 0° C. to 65° C. were synthesized. Representative reactants involved are shown in Table 1, below.

TABLE 1

| Reactant Type | Chemical Structure | Name |
|---|---|---|
| Mesogen | ![structure] | 5H |

(structure shown: $H_2C=CH-(CH_2)_3-O-$ [benzoyl-phenyl-phenyl-benzoyl] $-O-(CH_2)_3-CH=CH_2$)

TABLE 1-continued

| Reactant Type | Chemical Structure | Name |
|---|---|---|
| | [structure of 5tB: H₂C=CH—(CH₂)₃—O—C₆H₄—C(O)O—C₆H₃(tBu)—OC(O)—C₆H₄—O—(CH₂)₃—CH=CH₂] | 5tB |
| | [structure of 4Me: H₂C=CH—(CH₂)₂—O—C₆H₄—C(O)O—C₆H₃(Me)—OC(O)—C₆H₄—O—(CH₂)₂—CH=CH₂] | 4Me |
| | [structure of 5Me: H₂C=CH—(CH₂)₃—O—C₆H₄—C(O)O—C₆H₃(Me)—OC(O)—C₆H₄—O—(CH₂)₃—CH=CH₂] | 5Me |
| Flexible Spacer | H—Si(CH₃)₂—[O—Si(CH₃)₂]₇—H | HPDMS₇(S₃) |
| Cross-linker | [tetrakis(vinyldimethylsiloxy)silane structure] | tetrakis(vinyl-dimethyl-siloxy)silane(CL) |

The resulting polydomain smectic-C elastomer formed in the reaction undergoes isotropization upon heating through the clearing transition, allowing for subsequent stretching and fixing of a secondary uniaxially oriented smectic-C elastomer as can be seen from FIG. 1.

One advantage of the present main-chain smectic-C elastomers is that their thermal properties may be tailored by changing their composition. Accordingly, the shape memory main-chain smectic-C elastomer may exhibit a glass transition temperature of about −60 to about 50° C. at one atmosphere. Within this range, the glass transition temperature may be at least about −45° C., or at least about −40° C. Also within this range, the glass transition temperature may be up to about 45° C., or up to about 40° C. The shape memory main-chain smectic-C elastomer may exhibit a smectic-isotropic transition temperature of about 5 to about 70° C. at one atmosphere. Another advantage of the present main-chain smectic-C elastomers is that they are rubbery both above and below their shape transition temperatures. Thus, the shape memory main-chain smectic-C elastomer may exhibit a glass transition temperature and have a tensile modulus of about 0.1 to about 10 megaPascals at a temperature below the glass transition temperature. Within this range, the tensile modulus may be at least about 0.5 megaPascals, or at least about 1 megaPascals. Also within this range, the tensile modulus may be up to about 8 megaPascals, or up to about 5 megaPascals. In one embodiment, the shape memory main-chain smectic-C elastomer may exhibit an abrupt drop in tensile modulus as the temperature increases from room temperature to a temperature at or slightly above human body temperature. Thus, the shape memory main-chain smectic-C elastomer may exhibit a tensile modulus of at least 4 megaPascals at 20° C. and one atmosphere, and a tensile modulus of less than or equal to 0.2 megaPascal at 40° C. and one atmosphere. This modulus change may occur over an even narrower temperature window. For example, the elastomer may exhibit a tensile modulus of at least 4 megaPascals at 25° C. and one atmosphere. Or, the elastomer may exhibit a tensile modulus of less than or equal to 0.2 megaPascals at 35° C. and one atmosphere.

In the embodiments described above, the shape memory main-chain smectic-C elastomer is formed by a hydrosilylation reaction in which the liquid crystalline diene and the polyvinyl crosslinking agent provide the vinyl functionality, and the bis(silyl hydride) compounds provides the silyl hydride functionality. In an alternative embodiment, the shape memory main-chain smectic-C elastomer is formed by a hydrosilylation reaction in which the reaction mixture comprises the liquid crystalline diene and the bis(silyl hydride) compound, but the crosslinking agent may be either the polyvinyl crosslinking agent already described or a poly(silyl hydride) crosslinking agent. In this embodiment, the liquid crystalline diene has the structure wherein each occurrence of $R^1$ is independently selected from $C_2$-$C_{12}$ hydrocarbyl, $C_1$-$C_{12}$ hydrocarbyloxy, unsubstituted or substituted phenoxy, unsubstituted or substituted thiophenoxy, unsubstituted or substituted benzyl, unsubstituted or substituted benzoyl, unsubstituted or substituted phenyl sulfonyl, and unsubstituted or substituted phenyl sulfinyl; wherein each occurrence of m is 1 to about 10; and wherein n is 0 to 4. The value of "m" may be at least 2, or at least 3. The value of "m" may also be up to 8. The value of "n" may be 0, 1, 2, 3, or 4. In this embodiment, the poly(silyl hydride) crosslinking agent may be any compound comprising at least three silyl hydride groups (i.e., at least three Si—H groups). Suitable poly(silyl hydride) crosslinking agents include, for example, tetrakis(dimethylsilyloxy)silane, 2,4,6,8-tetramethylcyclotetrasiloxane, 2,4,6,8,10-pentamethylcyclopentasiloxane, and combinations thereof. In this embodiment, when the crosslinking agent is a poly(silyl hydride) crosslinking agent, the ratio of total vinyl groups in the liquid crystalline diene to the total silyl hydride groups in the bis(silyl hydride) compound and the poly(silyl hydride) crosslinker may be about 0.9 to about 1.1. Within this range, the ratio may be at least about 0.95. Also within this range, the ratio may be up to about 1.05. In one embodiment, the ratio is about 1.0.

The shape memory main-chain smectic-C elastomers may be described not only as the product of a particular hydrosilylation reaction, but also by the structure of the product itself. Thus, one embodiment is a shape memory main-chain smectic-C elastomer, comprising: first repeating units having the structure

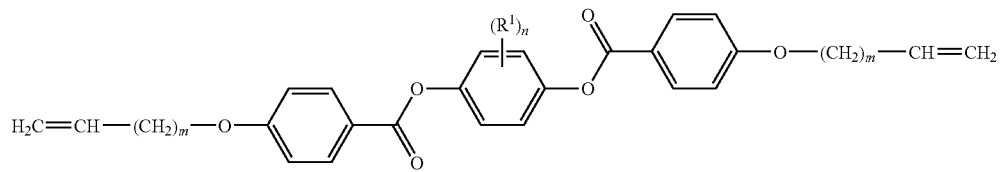

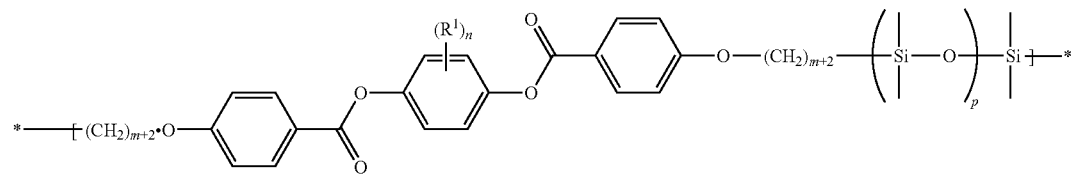

wherein each occurrence of m is independently 1 to about 10; wherein each occurrence of $R^1$ is independently selected from $C_1$-$C_{12}$ hydrocarbyl, $C_1$-$C_{12}$ hydrocarbyloxy, unsubstituted or substituted phenoxy, unsubstituted or substituted thiophenoxy, unsubstituted or substituted benzyl, unsubstituted or substituted benzoyl, unsubstituted or substituted phenyl sulfonyl, and unsubstituted or substituted phenyl sulfinyl; wherein n is 0 to 4; and wherein p is 1 to about 12; and second repeating units having the structure

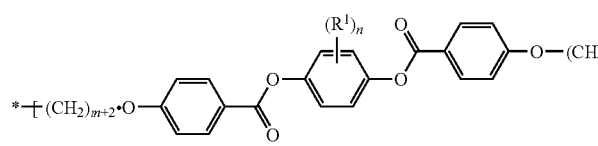

wherein each occurrence of m is independently 1 to about 10; wherein each occurrence of $R^1$ is independently selected from $C_1$-$C_{12}$ hydrocarbyl, $C_1$-$C_{12}$ hydrocarbyloxy, unsubstituted or substituted phenoxy, unsubstituted or substituted thiophenoxy, unsubstituted or substituted benzyl, unsubstituted or substituted benzoyl, unsubstituted or substituted phenyl sulfonyl, and unsubstituted or substituted phenyl sulfinyl; wherein n is 0 to 4; and wherein p is 1 to about 12. The additional characterizations of $R^1$, m, n, and p, described above in the context of the hydrosilylation reaction, apply here as well. The first repeating units correspond to subunits formed by the hydrosilylation reaction of the liquid crystalline diene and the hydride-terminated poly(dimethylsiloxane)s. The second repeating units correspond to first repeating units further reacted with tetrakis(vinyldimethylsilyloxy) silane crosslinking agent, which has itself reacted with three additional first repeating units. In one embodiment of the shape memory main-chain smectic-C elastomer above, each occurrence of m is 3, each occurrence of $R^1$ is tertiary butyl, each occurrence of n is 0 or 1 with the provisos that at least one occurrence of n is 0 and at least one occurrence of n is 1, and each occurrence of p is 7. In another embodiment of the shape memory main-chain smectic-C elastomer above, each occurrence of m is 2 or 3 with the provisos that at least one occurrence of m is 2 and at least one occurrence of m is 3, each occurrence of $R^1$ is methyl, each occurrence of n is 1, and each occurrence of p is 7.

The invention encompasses a method of preparing the shape memory main-chain smectic-C elastomer. Thus, one embodiment is a method of preparing the shape memory main-chain smectic-C elastomer, comprising: catalyzing a hydrosilylation reaction in a reaction mixture comprising
  (a) a liquid crystalline diene having the structure

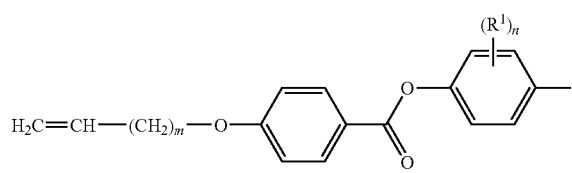

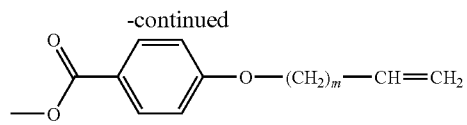

wherein each occurrence of $R^1$ is independently selected from $C_1$-$C_{12}$ hydrocarbyl, $C_1$-$C_{12}$ hydrocarbyloxy, unsubstituted or substituted phenoxy, unsubstituted or substituted thiophenoxy, unsubstituted or substituted benzyl, unsubstituted or substituted benzoyl, unsubstituted or substituted phenyl sulfonyl, and unsubstituted or substituted phenyl sulfinyl; wherein each occurrence of m is 1 to about 10; and wherein n is 0 to 4;
  (b) a polyvinyl crosslinking agent; and
  (c) a bis(silyl hydride) compound;
to form the shape memory main-chain smectic-C elastomer. In one embodiment of the method, the liquid crystalline diene comprises 1,4-bis[4-(4-pentenyloxy)benzoyl]hydroquinone and 2-tert-butyl-1,4-bis[4-(4-pentenyloxy)benzoyl]-hydroquinone; the crosslinking agent is tetrakis(vinyldimethylsiloxy)silane; and the bis(silyl hydride) compound has the structure

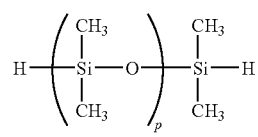

wherein p is 7. In another embodiment of the method, the liquid crystalline diene comprises 2-methyl-1,4-bis[4-(4-pentenyloxy)benzoyl]-hydroquinone and 2-methyl-1,4-bis[4-(4-butenyloxy)benzoyl]-hydroquinone; the crosslinking agent is tetrakis(vinyldimethylsiloxy)silane; and the bis(silyl hydride) compound has the structure

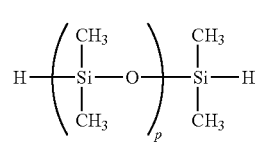

wherein p is 7.

The invention further encompasses compositions comprising any of the shape memory main-chain smectic-C elastomers described above, and optionally further comprising additional components. For example, the composition may optionally further comprise one or more additives such as, for example, liquid crystalline diluents, rubbers comprising crosslinkable functionality, reinforcing fillers, conductive fillers, heat stabilizers, light-absorbing dyes, and combinations thereof.

Figure 7:
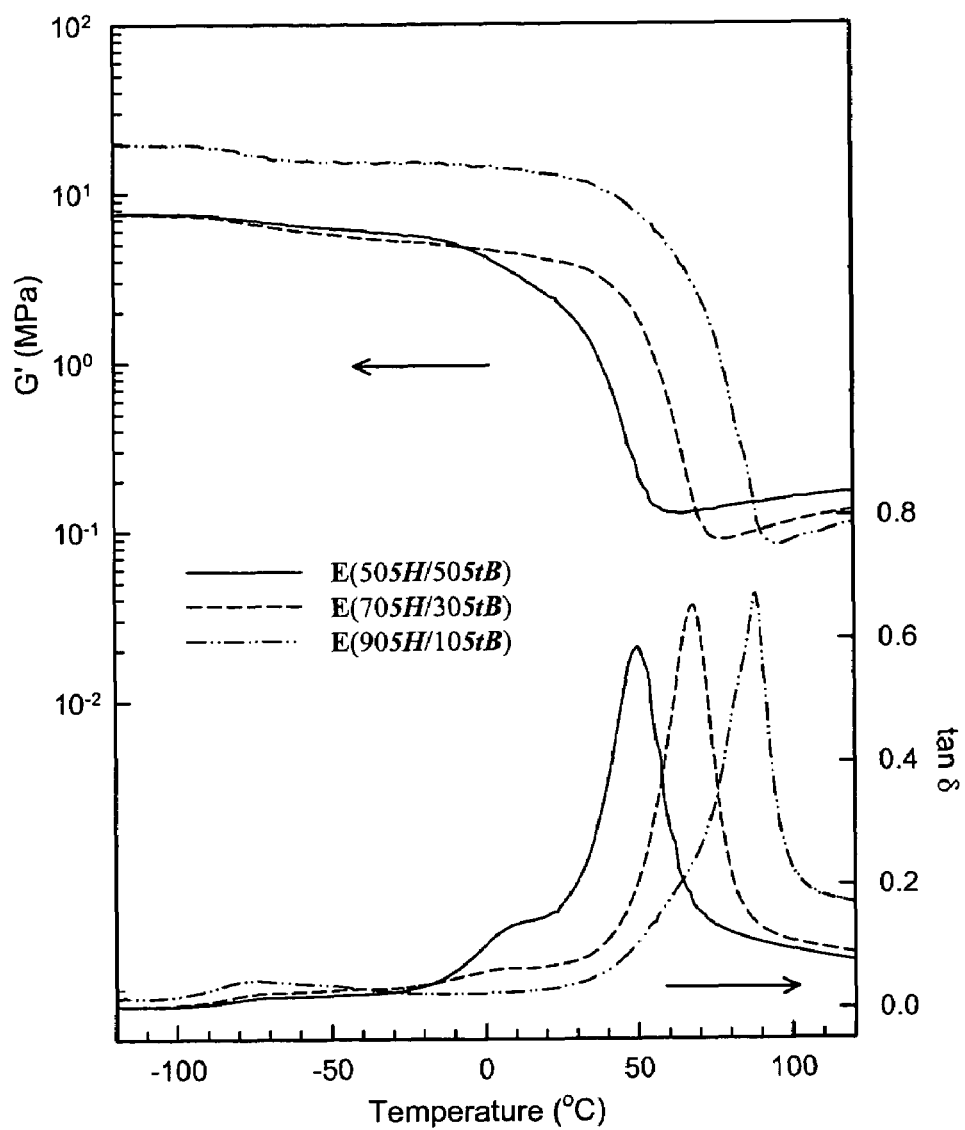
FIG. 7 shows linear viscoelastic shear properties of the E(x5H/y5tB) elastomers.

The invention further comprises a pressure-sensitive adhesive comprising any of the shape memory main-chain smectic-C elastomers described above. For example, the rheological properties of E(x5H/y5tB) series elastomers illustrated in FIG. 7, described below, indicate that these elastomers would be suitable for use in pressure sensitive adhesive compositions.

The invention further comprises articles comprising any of the shape memory main-chain smectic-C elastomers described above. For example, such articles include products for non-invasive medical applications, such as coatings for guidewires used in endoscopic surgery. As another example, the article may be an optical element such as, for example, a lens or shutter having applied thereon an optically transparent coating of a shape memory main-chain smectic-C elastomer. As another example, the article may be an implantable medical device. As yet further examples, the article may be an implantable intraocular lens, a shape memory contact lens, or a shape memory Fresnel lens.

Figure 2:
FIG. 2 illustrates the use of an E(5H/5tB) elastomer to form a reversible embossing medium.

Yet another embodiment of the invention is a reversible embossing medium comprising any of the shape memory main chain smectic-C elastomers described above. Particularly suitable for use in a reversible embossing medium are the E(x5H/y5tB) series elastomers and other such elastomers that exhibit one-way shape memory behavior. This embodiment is illustrated in FIG. 2, which shows a sequence of scanned images from an E(305H-705tB) film that was heated to body temperature and embossed with Print 1, then erased by heating to 50° C., and finally re-embossed with Print 2, again at body temperature. For this simple demonstration only a conventional flatbed scanner was used; much higher contrast will be possible with birefringence imaging or when scanning with off-normal illumination. Fingerprint collection and storage for homeland security purposes and disaster relief are potential applications. In addition, this surface shape memory phenomenon would be useful for microfluidic network printing that would use elastomer "blanks" that are printed on demand by embossing with a photolithographed master. An advantage over the present approach of polymerizing silicones for every microfluidic network is that here the shape memory elastomer surface can be easily erased and re-embossed as needed.

The invention further encompasses certain novel liquid crystalline dienes that are useful, at least, for forming the shape memory main chain smectic-C elastomers. Thus, one embodiment is a composition, comprising a liquid crystalline diene having the structure wherein each occurrence of $R^2$ is tertiary butyl, and wherein each occurrence of r, s, and t is independently 0 or 1 with the proviso that one and only one of r, s, and t is 1; and wherein each occurrence of m is independently 1 to about 10. With the range of 1 to 10, "m" may be at least 2, or at least three, or up to 8. In one embodiment, r and t are 0 and s is 1. In another embodiment, r and t are 0 and s is 1, and each occurrence of m is 3.

The invention is further illustrated by the following non-limiting examples.

EXAMPLE 1

This example generally describes the synthesis of mesogenic diene monomers. Scheme I represents the synthetic route followed for the preparation of the all the mesogenic dienes. The synthesis and characterization of some mesogenic dienes with unsubstituted and methyl-substituted central rings (i.e., some "n"H and "n"Me mesogens) has been previously reported. See, for example, B. Donnio, H. Wermter, and H. Finkelmann, *Macromolecules* 2000, 33, 7724-7729; G. Kossmehl, B. Gerecke, N. Harmsen, F. Schroeder, and H. M. Vieth, *Molecular Crystals and Liquid Crystals Science and Technology, Section A: Molecular Crystals and Liquid Crystals* 1995, 269, 39-53; G. Kossmehl, B. Gerecke, N. Harmsen, H. M. Vieth, and D. Wolff, *Molecular Crystals and Liquid Crystals Science and Technology, Section A: Molecular Crystals and Liquid Crystals* 1998, 317, 1-21; A. Shiota and C. K. Ober, *Journal of Polymer Science, Part A: Polymer Chemistry* 1996, 34, 1291-1303; and S. V. Arehart and C. Pugh, *Journal of the American Chemical Society* 1997, 119, 3027-3037. These reported preparation procedures have been modified here. To the best of our knowledge, the tertiary butyl-substituted mesogens, "n"tB, are new compounds whose preparation and characterization have not previously been described. The following sections describe the steps followed to synthesize the mesogens, in particular the synthesis of 1,4-bis[4-(4-pentenyloxy)benzoyl]hydroquinone, 5H.

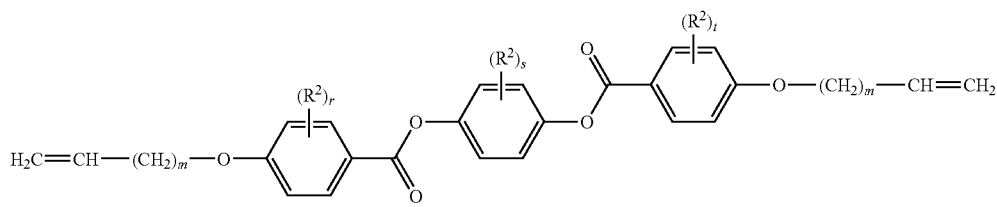

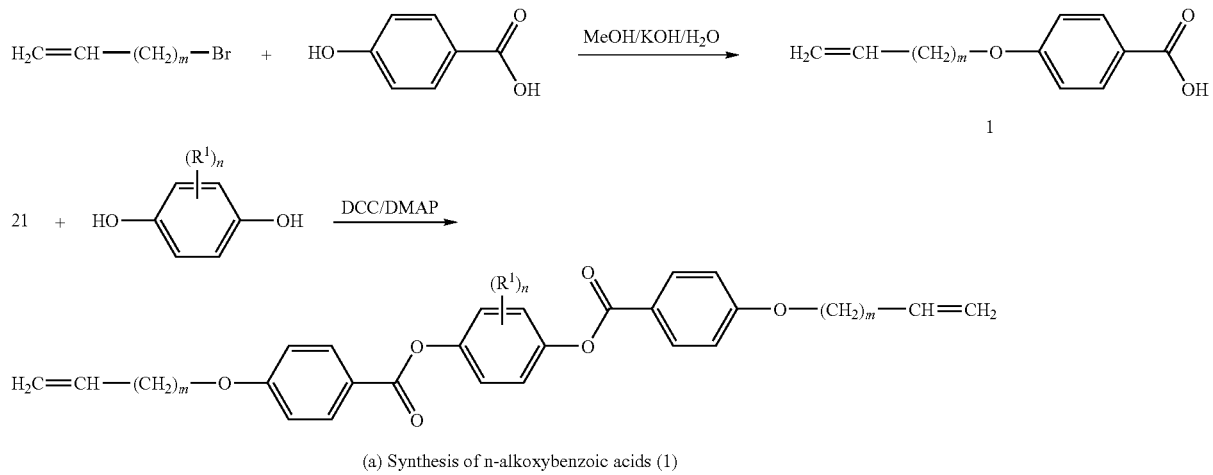

(a) Synthesis of n-alkoxybenzoic acids (1)

A representative n-alkyloxybenzoic acid (1), 5-pentenyloxybenzoic acid, was prepared as follows. In a 3-neck 500 milliliter round bottom flask under stirring, 30 grams (0.217 moles) 4-hydroxybenzoic acid was added to 135 milliliters of methanol, followed by the drop-wise addition of 45 milliliters of an aqueous solution of potassium hydroxide (45 weight percent). When the solution became clear, 36.6 grams of 5-bromo-1-pentene (0.254 moles) was added dropwise to the solution using an addition funnel. After refluxing for 16 hours at a temperature of about 85° C., the mixture was then cooled to room temperature and poured into 500 milliliters of deionized water to form a transparent yellow solution. An organic phase was then extracted with 100 milliliters diethyl ether (alternatively, hexanes) three times. To the aqueous phase, 100 milliliters of a 37% hydrochloric acid solution were added, leading to the precipitation of the desired product. The precipitate, a white solid, was collected after filtration and further recrystallized from ethanol. The purity and structure were confirmed by $^1$H-NMR. The yield before recrystallization was calculated to be about 50%. $^1$H NMR in D6-acetone gave, δ: 10.9 (1H, d), 7.98 (2H, d), 7.02 (2H, d), 5.88 (1H, m), 5.00 (2H, m), 4.11 (2H, t), 2.25 (2H, m), 1.90 ppm (2H, m).

Alternatively, 5-bromo-1-pentene is replaced by 4-bromo-1-butene, or 3-bromo-1-propene, to obtain the corresponding 4-butenyloxybenzoic acid, or allyloxybenzoic acid, respectively. No alteration to the above procedure was required.

(b) Synthesis of the Mesogens (M)

A representative mesogen, 1,4-bis[4-(4-pentenyloxy)benzoyl]hydroquinone, 5H, as follows. This exemplifies the steps followed for the synthesis of all the mesogen series. To a 250 milliliter Erlenmeyer flask, 12.0 grams (0.0585 mole) of 5-pentenyloxybenzoic acid 1, 12.0 grams (0.0585 mole) of 1,3-dicyclohexyl carbodiimide (DCC), and 3.20 grams hydroquinone (0.0293 mole), together with 0.64 gram of 4-(dimethylamino)pyridine (DMAP) were added to 120 milliliters of anhydrous dichloromethane. (All reactants and the solvent were obtained from Aldrich.) The reaction was carried out under magnetic stirring at room temperature for 48 hours before the precipitated product was isolated by filtration. After removal of dichloromethane by evaporation, the raw product (a brown solid) was collected and purified by recrystallization from a mixture of ethyl acetate and 2-propanol (70/30 v/v). The yield before recrystallization was approximately 65%. $^1$H-NMR in D6-acetone gave, δ: 8.14 (4H, d), 7.26 (4H, s), 7.12 (4H, d), 5.92 (2H, m), 5.04 (4H, m), 4.16 (4H, t), 2.28 (4H, m), 1.93 ppm (4H, m).

The methyl- and t-butyl-substituted mesogens 2-methyl- and 2-t-butyl-1,4-bis[4-(4-pentenyloxy)benzoyl]hydroquinone (5Me and 5tB, respectively) were synthesized in a similar manner to 5H (described above), but with methyl- or t-butylhydroquinone being substituted for hydroquinone. Unfortunately, such mesogens could not be purified by recrystallization. Instead, the final products were purified by column chromatography where the stationary phase was silica gel (0.040-0.063 μm, 230-400 mesh ASTM) and the eluent a mixture of ethyl acetate and hexanes (1:7 v/v), alternatively dichloromethane. The yields after purification were generally found to be lower for the t-butyl-substituted mesogens (ca. 20-40%), which was expected due to the steric hindrance of the lateral substituent thought to lead to some undesired monosubstituted compound that is separated chromotographically.

Similar methods were used to prepare 1,4-bis[4-(4-butenyloxy)benzoyl]hydroquinone (4H), 2-methyl- and 2-t-butyl-1,4-bis[4-(4-butenyloxy)benzoyl]hydroquinone (4Me and 4tB, respectively), and 1,4-bis[4-(4-allyloxy)benzoyl]hydroquinone (3H), 2-methyl- and 2-t-butyl-1,4-bis[4-(4-allyloxy)benzoyl]hydroquinone (3Me and 3tB, respectively).

The $^1$H-NMR chemical shifts characteristic of the various mesogens synthesized in this study are summarized in Table 2.

TABLE 2

Summary of the $^1$H-NMR chemical shifts in CDCl$_3$ observed for the mesogen series synthesized in this study.

| Mesogens | $^1$H-NMR Chemical Shifts(ppm) |
|---|---|
| 3H | 8.16(4H, d), 7.26(4H, s), 7.01(4H, d), 6.09(2H, m), 5.46(2H, d), 5.35(2H, d), 4.66(4H, d) |
| 3Me | 8.17(4H, m), 7.18(1H, d), 7.14(1H, s), 7.09(1H, d), 7.02(4H, t), 6.08(2H, m), 5.46(2H, d), 5.35(2H, d), 4.65(4H, s), 2.25(3H, s) |
| 3tB | 8.18(4H, t), 7.25(1H, s), 7.14(2H, d), 7.02(4H, t), 6.08(2H, m), 5.46(2H, m), 5.35(2H, m), 4.66(4H, s), 1.39(9H, s) |

TABLE 2-continued

Summary of the $^1$H-NMR chemical shifts in CDCl$_3$ observed
for the mesogen series synthesized in this study.

| Mesogens | $^1$H-NMR Chemical Shifts(ppm) |
|---|---|
| 4H | 8.16(4H, d), 7.27(4H, s), 7.00(4H, d), 5.93(2H, m), 5.18(4H, m), 4.13(4H, t), 2.62(4H, m) |
| 4Me | 8.16(4H, t), 7.14(3H, m), 6.99(4H, m), 5.92(2H, m), 5.17(4H, m), 4.12(4H, t), 2.60(4H, q), 2.25(3H, s) |
| 4tB | 8.17(4H, m), 7.25(1H, s), 7.13(2H, t), 7.01(4H, m), 5.92(2H, m), 5.18(4H, m), 4.13(4H, m), 2.61(4H, m), 1.38(9H, s) |
| 5H* | 8.14(4H, d), 7.26(4H, s), 7.12(4H, d), 5.92(2H, m), 5.04(4H, m), 4.16(4H, t), 2.28(4H, m), 1.93(4H, m) |
| 5Me | 8.16(4H, m), 7.18(1H, d), 7.14(1H, s), 7.09(1H, d), 6.99(4H, t), 5.87(2H, m), 5.06(4H, m), 4.08(4H, t), 2.29(4H, t), 2.26(3H, s), 1.96(4H, m) |
| 5tB* | 8.16(4H, m), 7.33(1H, s), 7.22(2H, t), 7.14(4H, m), 5.95(2H, m), 5.04(4H, m), 4.16(4H, t), 2.28(4H, m), 1.93(4H, m), 1.39(9H, s) |

*D6-Acetone solvent.

EXAMPLE 2

This example describes the synthesis and characterization of shape memory main-chain smectic-C elastomers. Generally, the elastomers may be prepared by catalyzed hydrosilylation of a reaction mixture comprising (a) a single mesogen or a mixture of 2 or more mesogens, (b) a crosslinking agent, and (c) a bis(silyl hydride) compound. In these experiments, the mesogens (a) were selected from the compounds described in Example 1, the crosslinking agent (b) was tetrakis(vinyldimethylsilyloxy)silane, and the bis(silyl hydride) compound (c) was hydride-terminated polydimethylsiloxanes with average degree of polymerization 7 (i.e., with seven repeating dimethylsiloxane units but eight total silicon atoms; obtained from Gelast, Inc. or Aldrich). Hydrosilylation reactions catalyzed by platinum(0)-1,3-divinyl-1,1,3,3-tetramethyldisiloxane complex in xylenes are known. See, for example, B. Donnio, H. Wermter, and H. Finkelmann, *Macromolecules* 2000, 33, 7724-7729; G. Kossmehl, B. Gerecke, N. Harmsen, H. M. Vieth, and D. Wolff, *Molecular Crystals and Liquid Crystals Science and Technology, Section A: Molecular Crystals and Liquid Crystals* 1998, 317, 1-21; and F. Tronc, L. Lestel, and S. Boileau, *Polymer* 2000, 41, 5039-5046. Below is described the representative elastomer synthesis for E(705H/305tB), an elastomer composed of a stoichiometric amount of mesogens and flexible spacer, hydride-terminated poly(dimethylsiloxane) DP=8 (S$_3$), where the mesogenic composition itself is 70 mole percent of 5H and 30 mole percent of 5tB, and the crosslinker concentration is 10 mole percent. Despite their similar structure, the thermal, physical, and optical behaviors of these LC dienes differ considerably. While 5H melts to a nematic phase at 136.6° C. and clears to an isotropic phase at 229.5° C., 5tB exhibits similar transitions at much lower temperatures of 80.6 and 91.4° C., respectively. It was therefore concluded that, via copolymerization of these two mesogens, properties of the final material could be specifically targeted. The overall scheme for the synthesis is given in FIG. 2.

In a Schlenk tube, 0.0727 gram (0.150 millimole) of 5H and 0.0366 gram (0.068 millimole) of 5tB were mixed together in anhydrous dichloromethane (ca. 1 millimole of mesogen per milliliter of solvent). The crosslinker, tetrakis(vinyldimethylsiloxy)silane, CL, was added to the reaction mixture (0.011 milliliter, 0.0226 mole). Since at room temperature the mixture was not completely soluble in CH$_2$Cl$_2$, the reaction vessel was brought up to higher temperature (ca. 45° C.) to allow solubilization at which point the Pt(0) catalyst (ca. 2-3 microliters) was added. The reaction vessel was then cooled in an ice bath before dropwise addition of the siloxane spacer, S$_3$. This procedure drastically decreased the gelation kinetics and, therefore, enabled transfer of the reactive solution/suspension to a polymerizing cell, where the crosslinking reaction was allowed to proceed for 24 hours at room temperature. In order to obtain homogeneous elastomers, it was found beneficial to allow for the reaction to start in the syringe used for the transfer of the suspension, as the suspension was allowed to warm from 0° C. to room temperature. This was readily monitored by loss of turbidity, corresponding to solubilization of the suspension. Once the crosslinking reaction completed, i.e., after the 24 hr period, the film was taken out of the polymerizing cell and the solvent allowed to evaporate at room temperature. Finally, before any further characterization, the samples were brought to their equilibrium configuration (relaxed state) by heat treatment in an oven at a temperature greater than or equal to T$_c$+15° C., where T$_c$ represents the clearing transition temperature of the resulting elastomer.

For comparison purposes, a mesogen-free elastomer was prepared by polymerizing S$_3$ with a higher molecular weight α,ω-divinyl-terminated poly(dimethylsiloxane) (weight average molecular weight($\overline{M}_w$)≈3000 g/mol) and 12.5 mol-% CL so that the resulting network structure would be very similar to the mesogen-bearing elastomers, particularly in terms of molecular weight/chain length between chemical crosslinks.

The thermal, optical, microstructural, and thermomechanical properties of the synthesized elastomers were investigated by using a combination of differential scanning calorimetry (DSC), polarizing optical microscopy (POM), wide-angle x-ray diffraction (WAXD), and shear and tensile dynamic mechanical analysis (DMA) techniques.

Two series of elastomers were synthesized: E(x5H/y5tB) and E(x4Me/y5Me). The chemical structures of their constitutive mesogens are given in Scheme 3. The mesogens differ

SCHEME 3

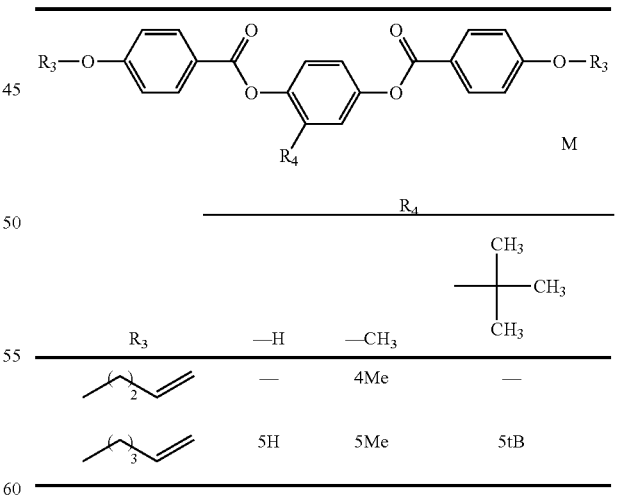

either by their lateral substituent, R$_4$, a hydrogen (H), methyl-(Me), or t-butyl-(tB) group, or by their end-group substitution, R$_3$, a butenyl-(4) or a pentenyl-(5) group. For the E(x5H/y5tB) series only the lateral substitution of the mesogens is varied, from an hydrogen to a t-butyl group, whereas, for the E(x4Me/y5Me) series, the lateral substitution of the mesogens is unchanged (methyl group) but the end-group is varied from a butenyl- to a pentenyl-chain. The thermal behavior of such mesogens is mainly affected by the lateral substitution. Indeed the substitution of 5H with a lateral t-butyl group, to yield 5tB, caused a drastic reduction of the transition temperatures, specifically the nematic-to-isotropic transition, $T_{NI}$, is reduced by about 140° C. and the melting transition, $T_m$, by about 60° C. In addition, t-butyl substitution greatly frustrated crystallization, revealing a well-defined glass transition, $T_g=-17°$ C. In contrast, 4Me and 5Me, which possess identical lateral substitution, exhibit very similar phase behaviors, with $T_{NI}$ around 180° C. and $T_m$ around 105° C.; the latter being, however, lower than the transition temperatures of their laterally hydrogen-substituted homologues, 4H, 5H.

Figure 3:
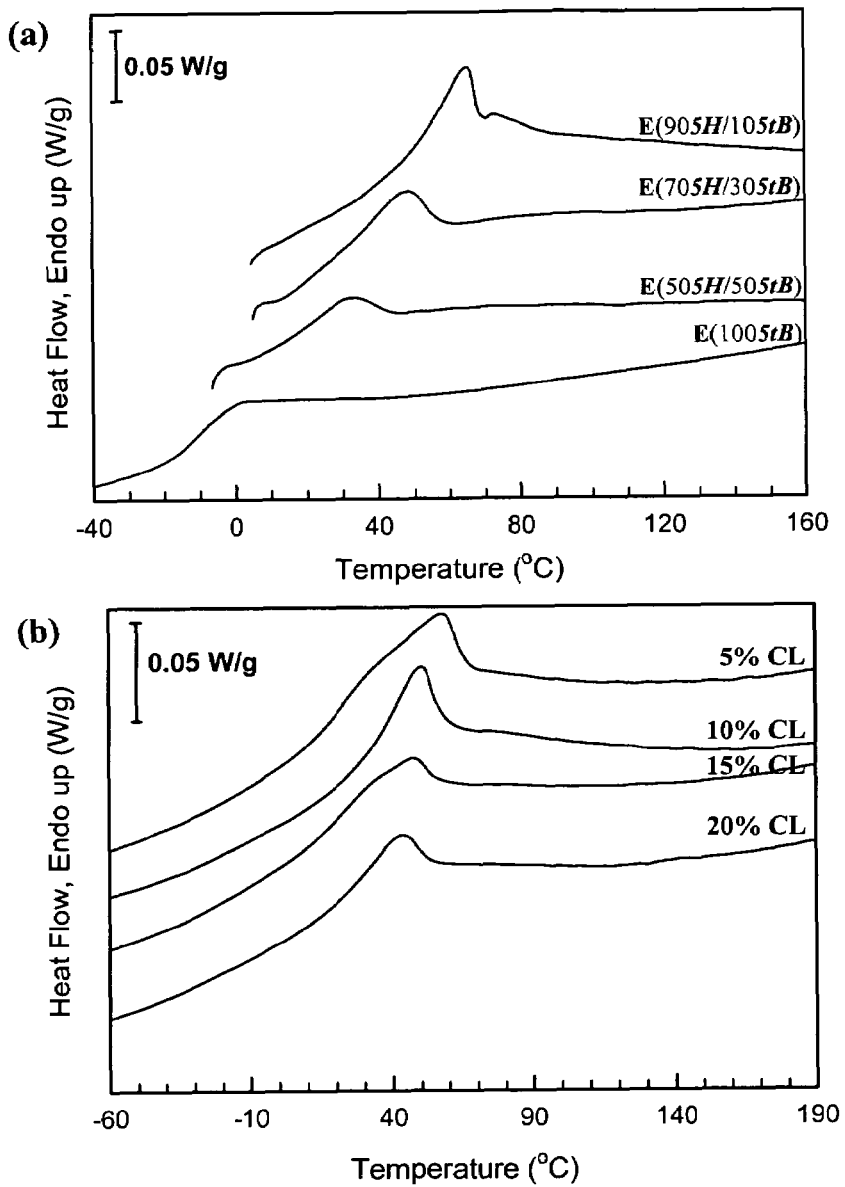
FIG. 3 shows differential scanning calorimetry traces as a function of (a) mesogen composition and (b) crosslinker concentration for elastomers prepared from mixtures of the 5H and 5tB mesogen dienes.
Figure 4:
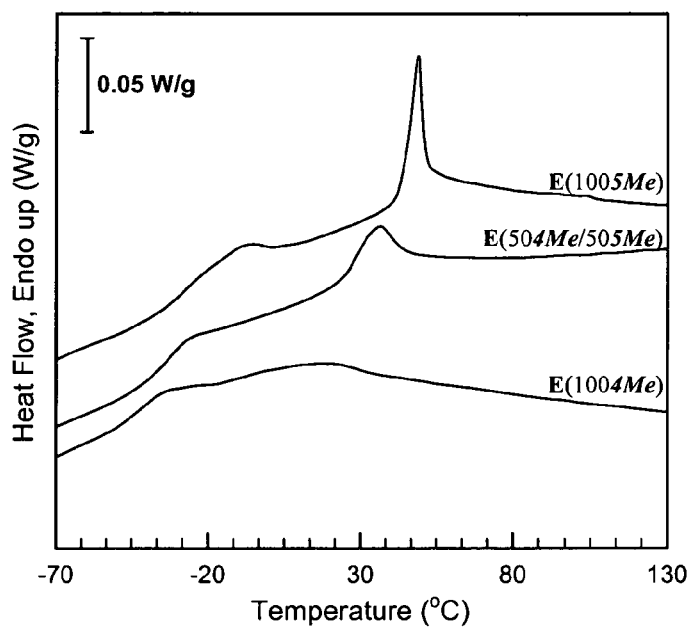
FIG. 4 shows differential scanning calorimetry traces as a function of mesogen composition for elastomers prepared from the 4Me and 5Me mesogen dienes.

The thermal behavior, as probed by DSC, characteristic of each elastomer series is given in FIGS. 3 and 4. FIG. 3 shows DSC traces on second heating at 10° C./minute for the E(x5H/y5tB) elastomer series. At lower temperature the step in heat flow is characteristic of the glass transition temperature undergone by the sample at $T_g$. For each elastomer of the E(x5H/y5tB) series (FIG. 3(a)), the glass transition at $T_g$ (step in heat capacity) is almost immediately followed by the clearing transition at $T_c$ (endothermic peak). With increasing 5H amount, the transition temperatures are shifted to higher values. As expected, increasing the crosslink density leads to a slight decrease in $T_c$ from 58.5° C. (5 mole percent CL) to 43.8° C. (20 mole percent CL) (FIG. 3(b). FIG. 4 shows DSC traces on second heating at 10° C./minutes for the E(x4Me/y5Me) elastomer series. At lower temperature the step in heat flow is characteristic of the glass transition undergone by the sample at Tg. At higher temperature, the clearing transition is characterized by an endotherm. Interestingly, the elastomers of the E(x4Me/y5Me) series exhibit much sharper exothermic peaks at $T_c$ (FIG. 4), which may be related to the high order of the observed smectic-C phase when compared to nematics. In addition, E(x4Me/y5Me) elastomers possess well separated glass transition and clearing transition, with a temperature window between the two of about 60 to 75° C. Upon increasing the amount of 5Me in the elastomers both $T_g$ and $T_c$ are shifted to higher temperatures. The resulting thermal properties of both elastomer series were effectively tailored via chemical composition. Both series exhibit a glass transition temperature, $T_g$, characterized by a step in heat capacity, ranging from −40 to 50° C., and a clearing transition temperature, $T_c$, ranging from about 3 to 73° C. characterized by an endothermic peak. In both cases, increasing the amount of the longer and/or more slender mesogen in the elastomer resulted in an increase of the thermal transition temperatures, with $T_g$ varying from −18.6 to 51.6° C. in the E(x5H/y5tB) series, and from −41.4 to −26.6° C. in the E(x4Me/y5Me), and $T_c$ varying from 2.9 to 73.2° C. in the E(x5H/y5tB) series, and from 19.7 to 49.0° C. in the E(x4Me/y5Me). The E(x5H/y5tB) series exhibit glass transitions and clearing transitions that occur almost simultaneously. This stands in contrast to the E(x4Me/y5Me) series, in which case a temperature window of about 60 to 75° C. separates $T_g$ and $T_c$.

Figure 5:
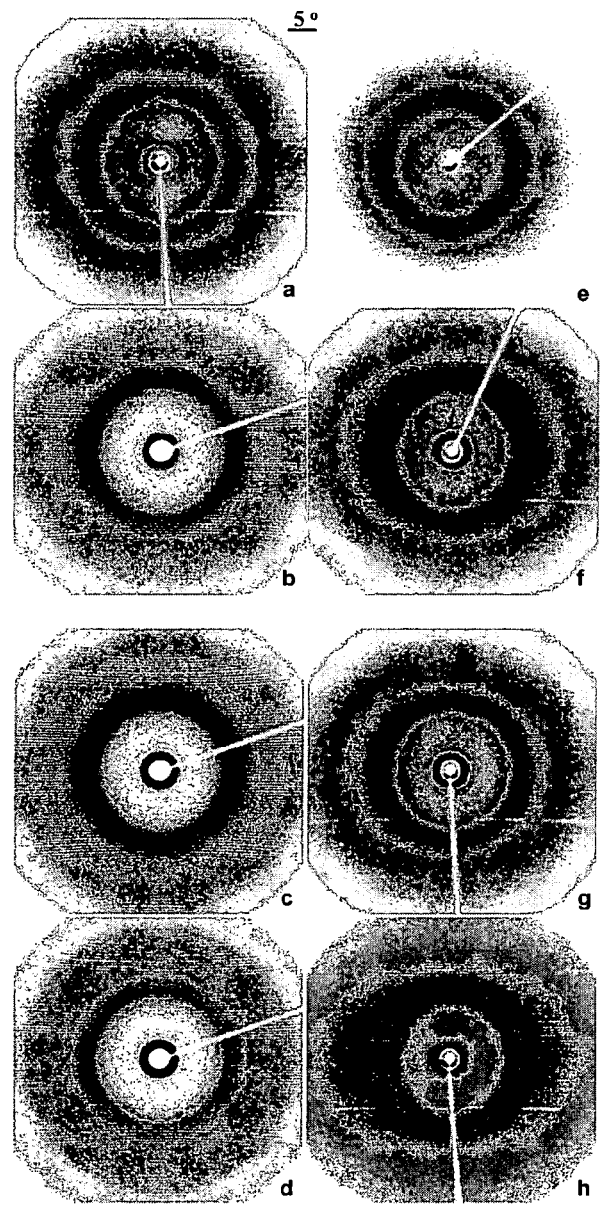
FIG. 5 shows wide-angle x-ray diffraction patterns for various elastomers of different compositions.
Figure 6:
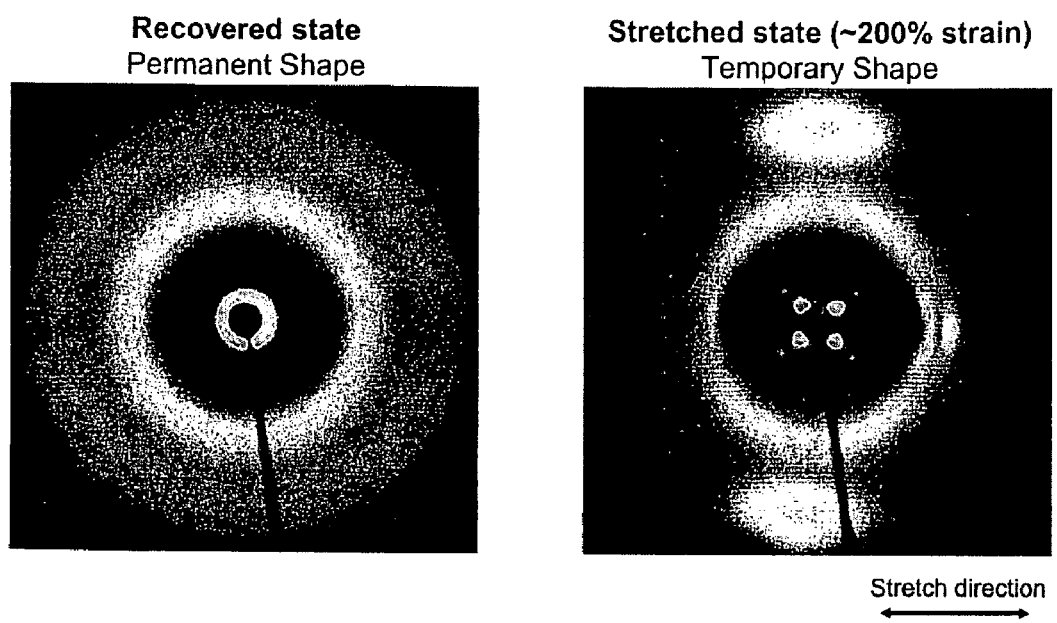
FIG. 6 shows wide-angle x-ray diffraction patterns for stretched and unstretched samples of E(905H/105tB)

Determination of the nature of the mesophase(s) exhibited by these elastomers required the use of wide-angle x-ray diffraction (WAXD) analysis. For this purpose a General Area Detector Diffraction System (GADDS) instrument was used at room temperature. All experiments were performed either on fibers drawn from the melt or on elastomer samples either in their relaxed or stretched states using a Bruker AXS instrument with a chromium source ($\lambda=2.291$Å). The scattering patterns were collected on a HiStar area detector placed at a distance of 6 cm from the sample and featuring an array of 512×512 detection elements. The sample-to-detector distance allowed for diffraction data to be measured between $2.4<2\theta<40°$, that is $54.70>d>3.35$Å. The x-ray power source was operated at 40 mA and 40 kV. Examples of 2D diffraction patterns obtained for such samples are given in FIG. 5. The patterns in FIG. 5 correspond to (a) E(1005tB), (b) E(505H/505tB), (c) E(705H/305tB), (d) E905H/105tB) (e) mesogen-free elastomer, (f) E(1004Me). (g) E(504Me/505Me), and (h) E(1005Me). The long axis film direction is vertical. Here, the samples were introduced in the x-ray beam in their relaxed state after an initial heat treatment at $T \leq T_c+15°$ C. to clear the samples and relax potential internal stresses. All 2D-patterns except that for sample (e) (which contained no mesogens) exhibit isotropic (unoriented) and relatively sharp rings at low 2θ angles characteristic of a smectic mesophase. At intermediate 2θ angles, the diffuse ring is due to the siloxane chain spacings while, at even higher 2θ angles, the diffuse ring results from the mesogen interspacing. The difference between in x-ray diffraction patterns for the recovered (permanent) shape and the stretched (temporary) shape for the E(905H/105tB) elastomer is illustrated in FIG. 6. The diffraction pattern for the stretched shape indicates long-range smectic order (second order reflections) and interlayer mesogen correlations (external arcs at high angle).

The new elastomers described herein exhibit shape memory properties triggered by their glass transition, as well as spontaneously reversible shape changes about their smectic-to-isotropic transition. Here, shape memory refers to a thermomechanical phenomenon in which large distortions may be "fixed" and later relaxed to an equilibrium shape under an environmental trigger. Spontaneously reversible actuation (thermoelasticity) refers to the change of shape, expansion or contraction, exhibited by the elastomers on going from their isotropic state to their anisotropic liquid crystalline state, or vice versa, under constant stress. While not wishing to be bound by any particular hypothesis, the inventors believe that spontaneously reversible actuation is related to intrinsic coupling between liquid crystalline order and rubber elasticity.

The solid viscoelastic properties were evaluated by using dynamic mechanical analysis (DMA). The linear viscoelastic shear properties of the E(x5H/y5tB) elastomers are presented in FIG. 7 as storage modulus and tan δ data measured in shearing mode on heating (3° C./minute) at 10 Hz. The samples were loaded in the DMA at room temperature in their relaxed state after initial heat treatment at $T \leq T_c+15°$ C. Importantly, over the entire temperature window tested ($-120 \leq T \leq 120°$ C.) the modulus is rubbery, always lower than 20 MPa, even below $T_g$. At about −70° C., a small mechanical relaxation is observed and attributed to the melting of residual crystallinity of the siloxane chains. This is confirmed by DSC analysis of the mesogen-free elastomer, which, indeed, shows a melting transition at −50.7° C. ($\Delta H=19.55$ J/g). At a higher temperature, $-15 \leq T \leq 10°$ C., a second, composition-dependent relaxation is observed, this one attributed to the glass transition of the mesogen-rich phase, as confirmed by the equivalent DSC traces. Finally, at still higher temperatures, a large drop in G' is observed, characterizing the clearing transition of the elastomers. As expected from the DSC traces, the latter occur at temperatures that depend on the elastomer composition, increasing with increasing 5H content. The rheological properties revealed in FIG. 7 indicate that the E(x5H/y5tB) elastomers are suitable for use in pressure sensitive adhesive compositions.

Figure 8:
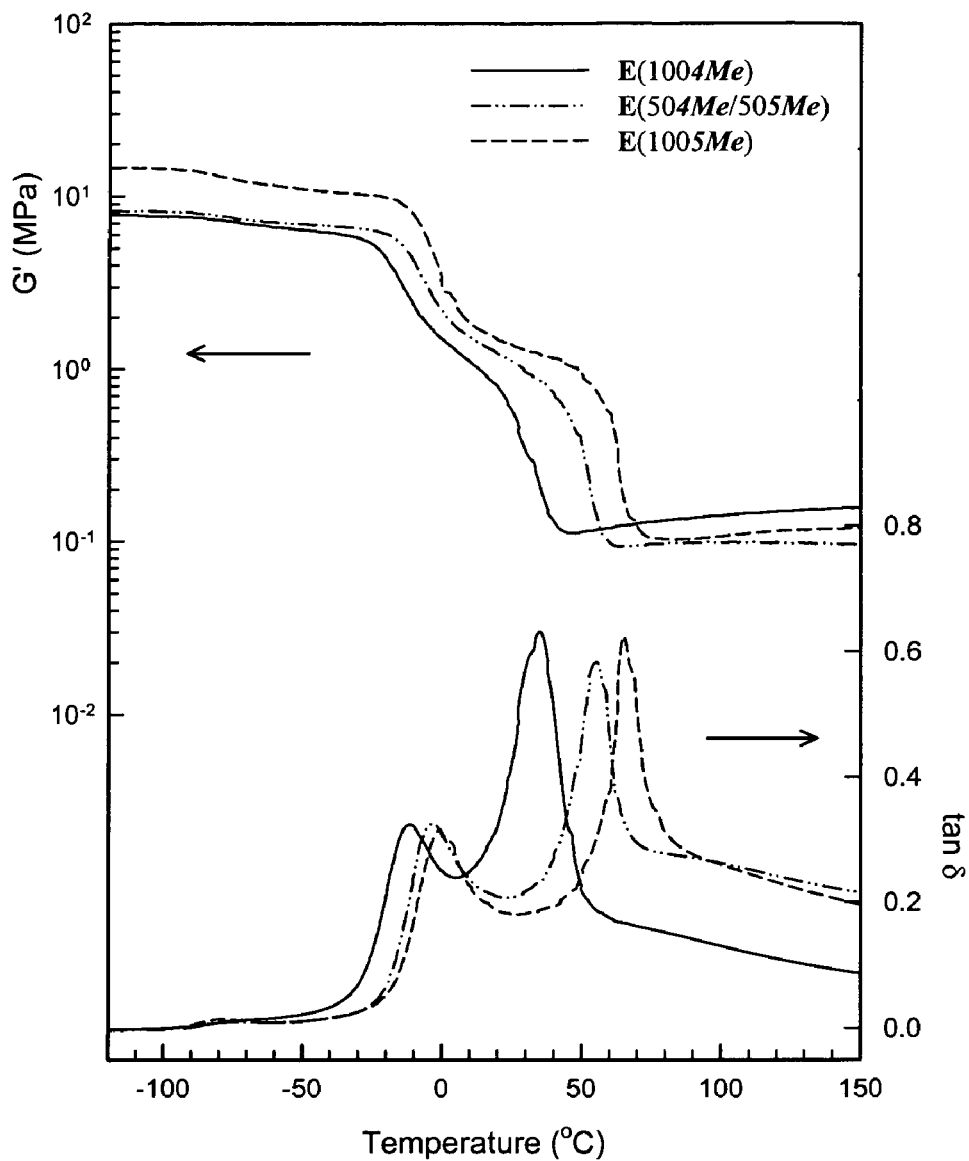
FIG. 8 shows linear viscoelastic shear properties of the E(x4Me/y5Me) elastomers.

Similarly, FIG. 8 shows the solid viscoelastic properties of the E(x4Me/y5Me) elastomers obtained on heating (3° C./minute) at 10 Hz. In this case, the drops in modulus characteristic of the glass transition and clearing transition are well-separated. Again, over the entire temperature window tested the storage modulus remains rubbery with a maximum of G' value of 14.6 MPa. At about −80° C., the first transition is caused by residual crystallization of the siloxane chains. At intermediate temperature, −30≦T≦20° C., a second transition is observed and corresponds to the glass transition, $T_g$, of the materials. In contrast to the E(x5H/y5tB) elastomers, the step G' at the glass transition for the E(x4Me/y5Me) elastomers appears to be composition-independent. Indeed, while the peak in tan δ at $T_g$ decreases with decreasing 5H content in the corresponding elastomers of the E(x5H/y5tB) series, that of the E(x4Me/y5Me) elastomers remains unchanged with varying elastomer composition. While not wishing to be bound by any particular hypothesis, we postulate that not only is the glass transition due to the mesogen-rich smectic layers but, more specifically, it is closely related to the relaxation of the bulky lateral substituent of the mesogens. Finally, the last transition indicated by a peak in tan δ (drop in G') is characteristic of the clearing transition.

Both the shape memory behavior (shape fixing and shape recovery) and the spontaneous deformation at $T_c$ of these new MC-LCEs were characterized using a dynamic mechanical analyzer (DMA 7e from Perkin Elmer) in tensile mode. The data were analyzed using Pyris software, version 3.81, from Perkin Elmer™ Instruments. The samples were cut into rectangular strips in such a way that the resulting length to width ratio was equal or greater than 5:1 to allow for true tensile measurements. These were then loaded in the tensile fixture of the DMA and heated to above their clearing transition under small load (0.01N) as required by the instrument. The overall thermomechanical response is referred to as shape memory cycle. The latter is expressed in the form of a 3D-plot of the strain versus temperature versus nominal (engineering) stress. After the samples have been loaded and heated to above their clearing transition, the shape memory characterization of the materials can take place. During the first deformation stage, the samples are stretched under constant force ramping rate (0.01N/min) to a desired force (0.03-0.05 N). Subsequently, an isostress cooling stage at a constant temperature ramping rate of 2° C./min is completed to reach low temperature, below the clearing transition temperature, $T_c$, and/or the glass transition temperature, $T_g$. This allows for fixing (T<$T_g$) or not (T<$T_c$) of the deformed shape resulting from the deformation step. The third stage of the shape memory cycle, shape fixing, consists of the isothermal release of the force applied to the samples at a constant force ramping rate of 0.01 N/min to the preload force (0.01 N). This stage is done isothermally (either at T<$T_g$ or at T<$T_c$) and allows determination of the shape fixing, $R_f$, abilities of the elastomers. Finally, the last stage of the shape memory cycle, or shape recovery stage, is performed by heating the sample to the initial temperature (above $T_g$ and/or $T_c$) at 2° C./min under constant small load (0.01 N). During this last stage, the shape recovery abilities, $R_r$, of the elastomer may be determined. In the following sections the shape memory and spontaneously reversible actuation properties exhibited by these new main-chain liquid crystalline elastomers are described. By adequately choosing the elastomer composition, the spontaneously reversible actuation and shape memory could be superimposed, effectively switching "off" the former and resulting in rubbery shape memory materials capable of high strains (up to 250% or more). The equations used to quantify $R_f$ and $R_r$ are:

$$R_f = \frac{L_u - L_i}{L_t - L_i} \times 100\% \qquad (1)$$

$$R_r = \frac{L_u - L_f}{L_t - L_i} \times 100\% \qquad (2)$$

where $L_i$=Initial length, $L_t$=temporary length, $L_u$=Unloaded length, and $L_f$=Final recovered length of tensile specimens. In the following sections the shape memory and spontaneously reversible actuation properties exhibited by these new main-chain liquid crystalline elastomers are described. By adequately choosing the elastomer composition, the spontaneously reversible actuation and shape memory could be superimposed, effectively separating the two and resulting in rubbery shape memory materials capable of high strains (up to 250% or more). In particular, compositions yielding a mesogen-phase $T_g$ close to $T_{SI}$ (including those with more than 30 mol-% 5tB, with respect to total mesogen content) exhibit one-way shape memory. Compositions yielding a mesogen-phase $T_g$ substantially lower than $T_{SI}$ ($T_{SI}$−$T_g$>20° C., including those containing 100 mol-% 4Me, 100 mol-% 5Me, or copolymers of the same) exhibit spontaneous reversible actuation at $T_{SI}$ and one-way shape memory at $T_g$.

Figure 9:
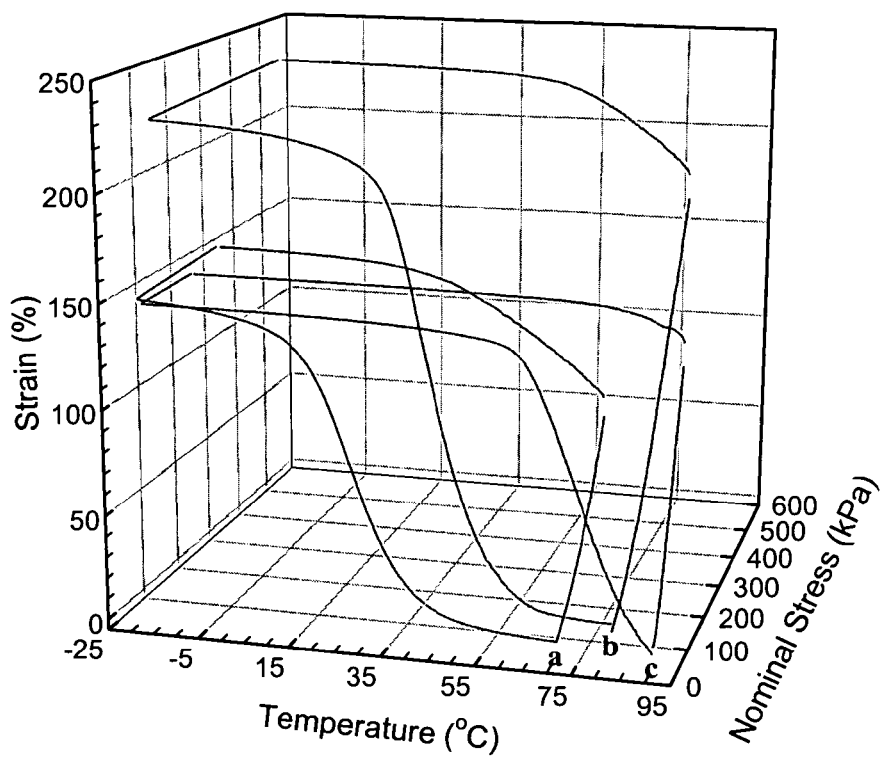
FIG. 9 shows shape memory cycles of E(x5H/y5tB) elastomers.

In FIG. 9 the shape memory cycles characteristic of various elastomers from the E(x5H/y5tB) series are given: (a) E(505H/505tB), (b) E(705H/305tB), and E(905H/105tB). The starting point of the shape memory cycles coincides with the letters. In the first stage of the shape memory cycle, the deformation stage, the elastomers are stretched under a liner force ramp to a desired final force. The strains developed during this stage, for the stresses applied here, reach up to 169% for E(705H/305tB) (almost triple the original length). Upon cooling under constant force below the superimposed clearing and glass transition temperatures, the latter strains were fixed. The shape fixing (third stage) and shape recovery (fourth stage) abilities are found to be extremely high, close to 100%. Their values are listed in Table 3. These are characteristic of shape memory materials with excellent performances, which not only compete with but also challenge the performances exhibited by traditional shape memory materials.

TABLE 3

Summary of the shape fixing, $R_f$, and shape recovery, $R_r$, values for the elastomers synthesized here, along with values measured in prior studies for classic shape memory polymers (SMPs). The mesogen-free elastomer did not show shape memory properties. The shape memory properties of our elastomers are excellent and better than these of classic SMPs.

| Materials | $T_g$ (° C.) | $T_c$ (° C.) | $T_{rl}$ (° C.) | $T_{ru}$ (° C.) | $R_f$ (%) | $R_r$ (%) |
|---|---|---|---|---|---|---|
| Mesogen-free | $T_m$ = 50.5 | | No Shape Memory Effect | | | |
| E(1005tB) | −14.0 | 2.9 | −1.6 | 6.1 | 99.5 | 98.5 |

TABLE 3-continued

Summary of the shape fixing, $R_f$, and shape recovery, $R_r$, values for the elastomers synthesized here, along with values measured in prior studies for classic shape memory polymers (SMPs). The mesogen-free elastomer did not show shape memory properties. The shape memory properties of our elastomers are excellent and better than these of classic SMPs.

| Materials | $T_g$ (° C.) | $T_c$ (° C.) | $T_{rl}$ (° C.) | $T_{ru}$ (° C.) | $R_f$ (%) | $R_r$ (%) |
|---|---|---|---|---|---|---|
| E(505H/505tB) | −18.6 | 33.0 | 24.6 | | 97.8 | 100.0 |
| E(705H/305tB) | 30.0 | 47.7 | 38.4 | | 96.0 | 98.5 |
| E(905H/105tB) | 51.6 | 73.2 | 71.0 | | 99.4 | 100.2 |
| E(1004Me) | −41.4 | 19.7 | 10.5 | 25.8 | 96.2 | 96.9 |
| E(504Me/505Me) | −35.1 | 36.1 | 2.43 | 37.8 | 99.5 | 98.3 |
| E(l005Me) | −26.6 | 49.0 | U | 50.4 | 98.3 | 99.7 |
| PU[a] | | $T_m = 55$ | | 55 | 92 | 82 |
| EVA[b] | | $T_m \approx 60$ | | ~60 | 95.0 | 98.3 |

$T_{rl}$ and $T_{ru}$: lower and upper triggering temperature for recovery, respectively;
$T_m$, $T_g$, $T_c$: melting, glass, and clearing transition temperatures, respectively;
U: undetermined.
[a]Data from B. K. Kim, S. Y. Lee, and M. Xu, Polymer 1996, 37, 5781-5793.
[b]Data from F. Li, W. Zhu, X. Zhang, C. Zhao, and M. Xu, Journal of Applied Polymer Science 1999, 71, 1063-1070.

Figure 10:
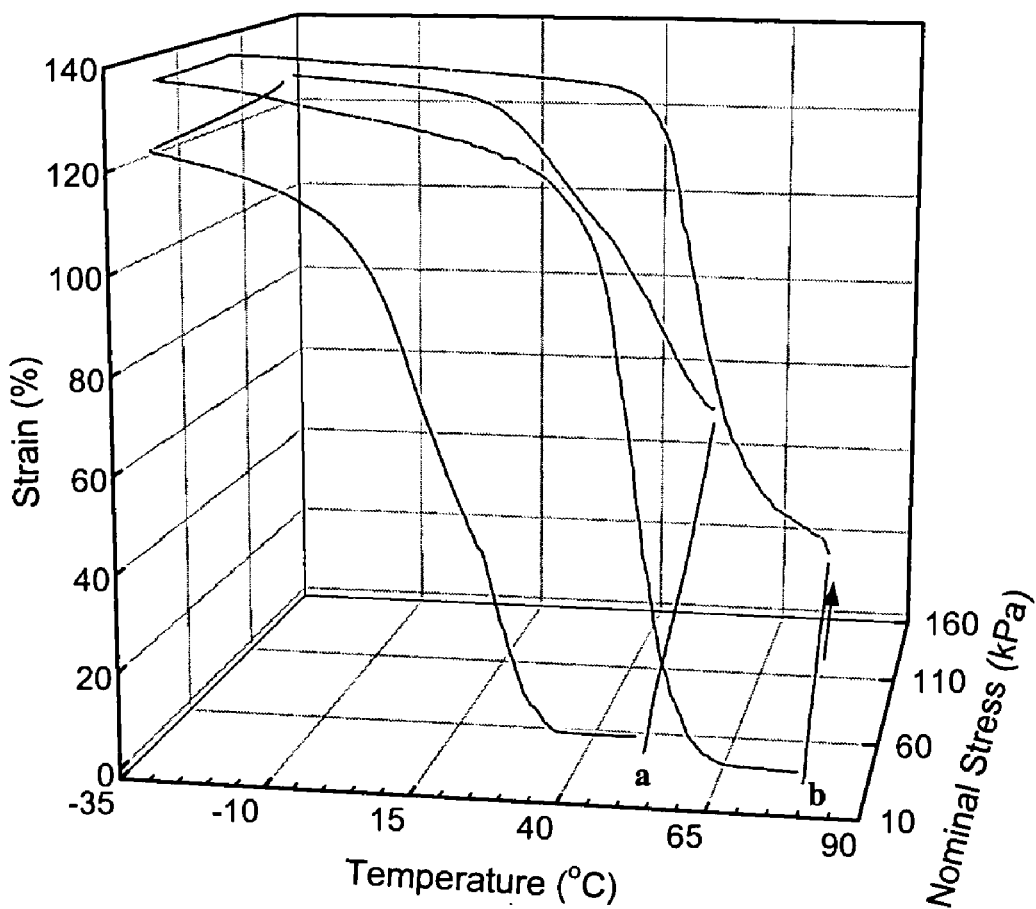
FIG. 10 shows shape memory cycles of E(1004Me) and E(1005Me) elastomers.

For comparison, FIG. 10 shows the shape memory cycles of (a) E(1004Me) and (b) E(1005Me). The starting point of each cycle is indicated with the letter. In these cases, the strains achieved by the end of the deformation stage were purposefully smaller than those obtained for the E(x5H/y5tB) series described earlier. In particular, they reach only about 46% for the E(1004Me), because smaller stresses, in these examples, about 4 times smaller than those applied on the E(705H/305tB) sample were used. During the cooling/fixing (second) stage of the shape memory cycle, significant additional strain is seen to develop sharply on cooling under constant stress, yielding final values of 126 and 135% (more than double the initial sample length) for both samples. While not wishing to be bound by any particular hypothesis, the present inventors believe that this additional extension is a consequence of 'soft elasticity'. During the last (recovery) stage of the shape memory cycle both the strains developed during the deformation and the cooling/fixing stages are recovered as the final strains are close to 0%. The recovery process in these cases occur in two steps, with an initial recovery triggered by $T_g$ of the mesogen-rich phase, followed by a $T_c$-triggered recovery. Importantly, as for the E(x5H/y5tB) elastomers, their shape fixing, $R_f$, and shape recovery, $R_r$, abilities are excellent and close to 100%. However, most of the strain attained at low temperature results from the spontaneous deformation occurring during the cooling step of the shape memory cycle (second state), not the deformation step (first stage). These results are summarized in Table 3 along with those calculated for the E(x5H/y5tB) series. For comparison purposes, values measured in prior studies for classic shape memory materials, specifically segmented polyurethane sample (PU) and crosslinked ethylene-vinyl acetate sample copolymers (EVA) are also given. Overall, the new elastomers are found to perform as well, or better, in terms of shape fixing and shape recovery, than classic shape memory polymers. Depending on the material, the recovery appears to occur in one or two steps, triggered by $T_g$ and/or $T_c$. While the upper triggering temperatures for recovery, $T_{ru}$, appears very well correlated to the clearing transition, the lower, $T_{rl}$, seems to correlate to the glass transition.

Figure 11:
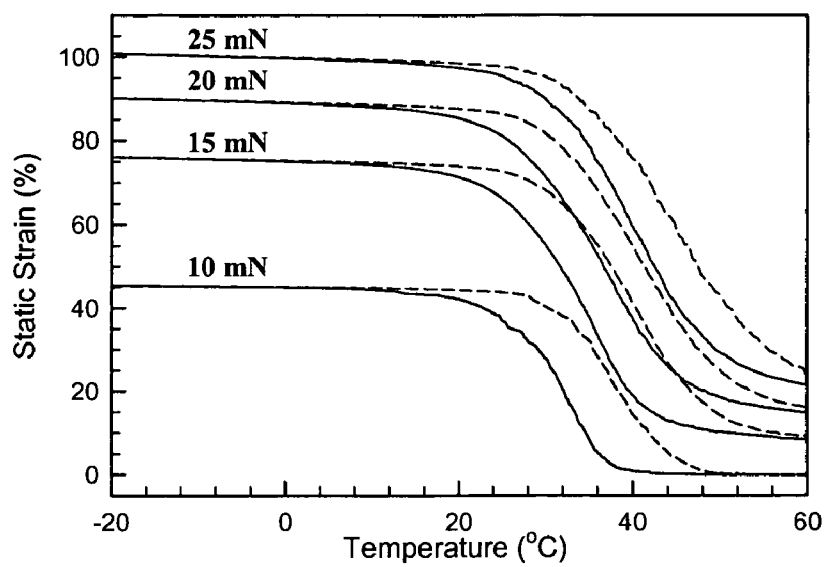
FIG. 11 shows stress versus temperature curves for E(504Me/505Me) elastomer as a function of applied strain.
Figure 12:
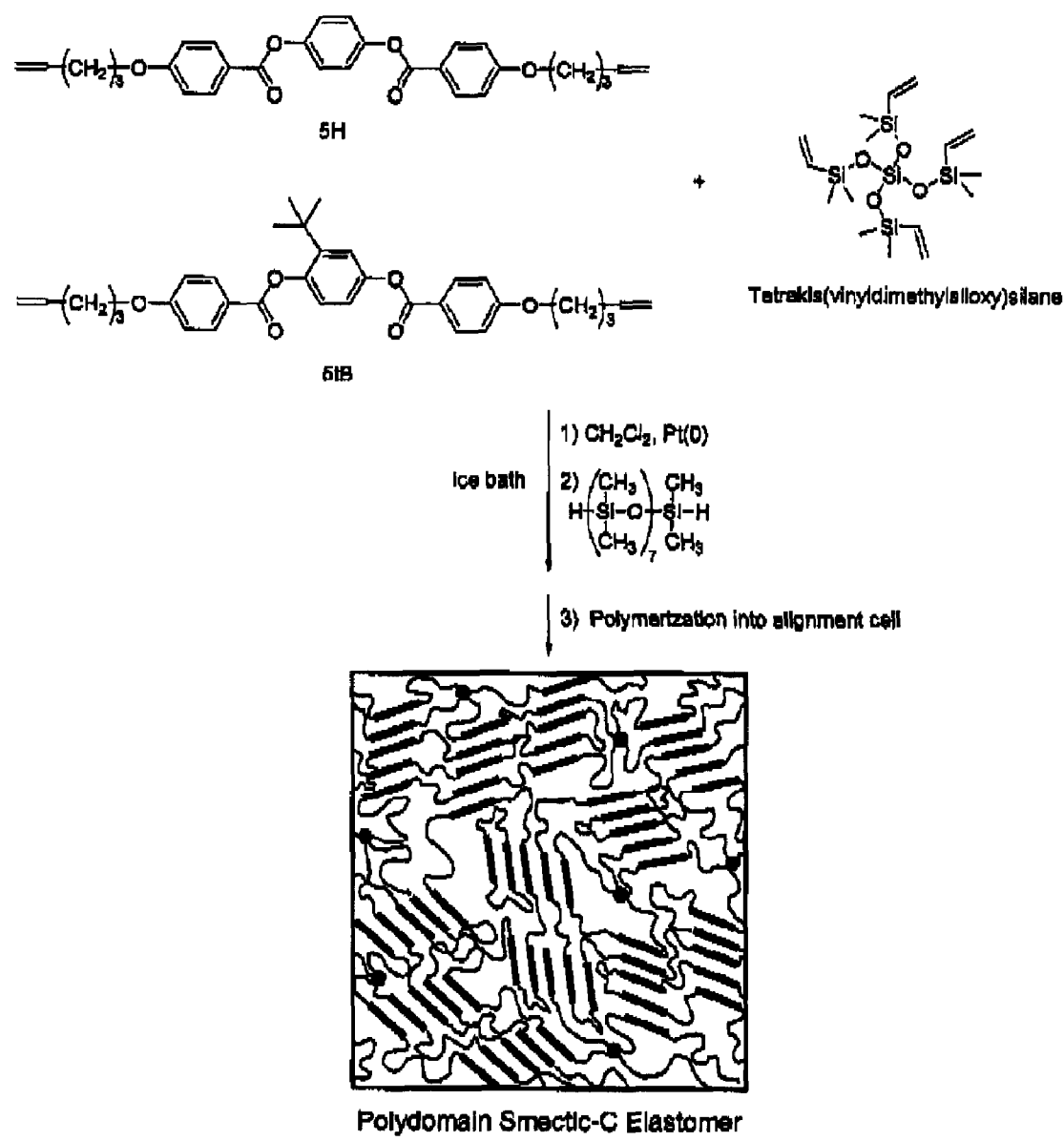
FIG. 12 shown liquid crystalline dienes, 5H and 5tB, along with a tetravinyl siloxane crosslinker dissolved in $CH_2Cl_2$, Pt catalyst, and a stiochiometric (1 silane; 1 vinyl) amount of hydride-terminated siloxane and allowed to polymerize in a cell.

The spontaneous deformation effect observed on heating and cooling E(x5H/y5tB) elastomers is further illustrated in FIG. 11. FIG. 11 is a plot of stress versus temperature curves for E(504Me/505Me) elastomer as a function of applied strains of 10, 15, 20, and 25 mN. Solid lines correspond to cooling, and dashed lines correspond to heating. Constant cooling and heating rates of 3° C./minute were used. Thermoelasticity is evidenced by the spontaneous extension and contraction upon cooling below $T_c$ and heating above $T_c$, respectively. While not wishing to be bound by any particular hypothesis, the present inventors believe that the hysteresis observed is a consequence of the polydomain-monodomain (P-M) transition. By exhibiting not only contraction on heating but also expansion on cooling, the E(504Me/505Me) elastomer exhibits a two-way shape memory effect.

In summary, by varying chemical composition of two elastomer series, E(x5H/y5tB) and E(x4Me/y5Me), tailorable thermal properties were achieved with low transition temperatures, typically with glass transition temperatures, $T_g$, ranging from about −40 to 50° C. and clearing transition temperatures, $T_c$, from about 3 to 73° C. While the glass transition and clearing transition temperatures occur in a very narrow temperature window in the E(x5H/y5tB) elastomer series, they are well-separated in the E(x4Me/y5Me) series. These elastomers exhibit similar phase behavior: they exist at low temperatures in a low modulus liquid crystalline glass form, which transforms to a smectic-C mesophase at higher temperatures that finally clears to an isotropic rubber. Importantly, the elastomers possess rubbery modulus (<20 MPa) for all temperatures tested, below and above $T_g$. All elastomers show shape memory properties with excellent shape fixing and shape recovery capabilities compared to classic shape memory systems (>95%). The recovery of the deformation imposed during the shape memory cycle appears to be triggered by the glass transition. Moreover, the smectic-C elastomers also exhibit soft elasticity resulting in an additional spontaneous elongation (or contraction) on cooling (or heating) of the materials under constant stress. Wide-angle x-ray diffraction and polarized optical microscopy experiments not described here suggest that this behavior is related to the mechanically induced polydomain-to-monodomain transition upon entering the smectic phase on cooling. By superimposing $T_g$ and $T_c$ via chemical composition variation the spontaneous deformation can be "switched off", in which case the fixing of the imposed deformed shape during the shape memory cycle takes places prior to any setting in of the spontaneous deformation resulting from soft elasticity.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another.

The invention claimed is:

1. A shape memory main-chain smectic-C elastomer, consisting of the hydrosilylation product of a reaction mixture comprising:

(a) a liquid crystalline diene having the structure

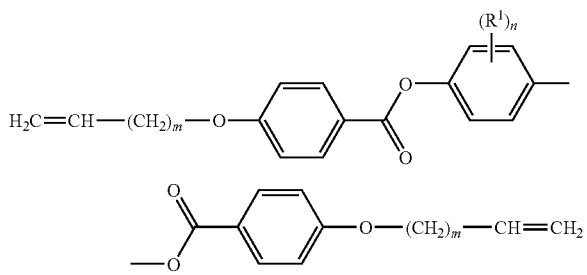

wherein each occurrence of $R^1$ is independently selected from $C_1$-$C_{12}$ hydrocarbyl, $C_1$-$C_{12}$ hydrocarbyloxy, unsubstituted or substituted phenoxy, unsubstituted or substituted thiophenoxy, unsubstituted or substituted benzyl, unsubstituted or substituted benzoyl, unsubstituted or substituted phenyl sulfonyl, and unsubstituted or substituted phenyl sulfinyl; wherein each occurrence of m is 1 to about 10; and wherein n is 0 to 4;

(b) a polyvinyl crosslinking agent; and (c) a bis(silyl hydride) compound.

2. The shape memory main-chain smectic-C elastomer of claim 1, wherein the liquid crystalline diene comprises a first liquid crystalline diene having the structure

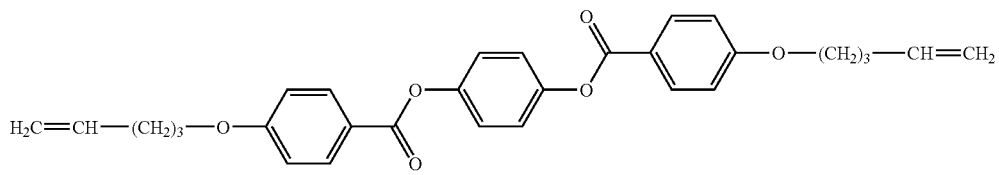

and a second liquid crystalline diene having the structure

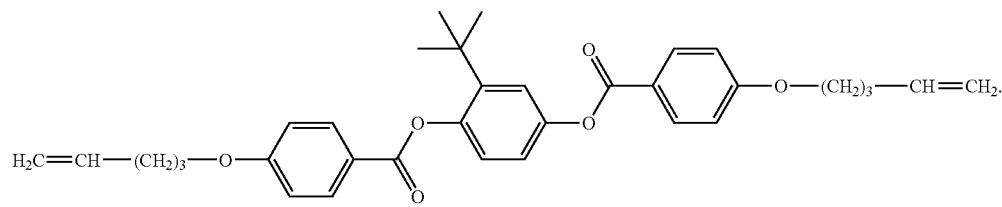

3. The shape memory main-chain smectic-C elastomer of claim 2, wherein the liquid crystalline diene comprises about 10 to about 99 weight percent of the first liquid crystalline diene and about 1 to about 90 weight percent of the second liquid crystalline diene, based on the total weight of the liquid crystalline diene.

4. The shape memory main-chain smectic-C elastomer of claim 1, wherein the liquid crystalline diene comprises a first liquid crystalline diene having the structure

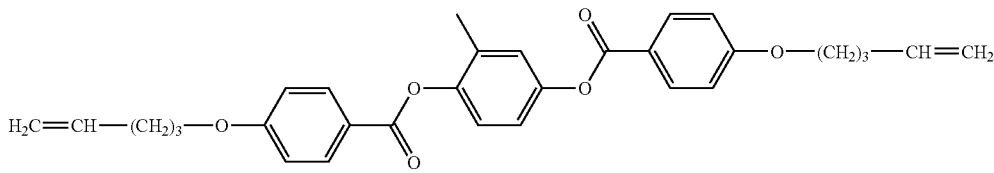

and a second liquid crystalline diene having the structure

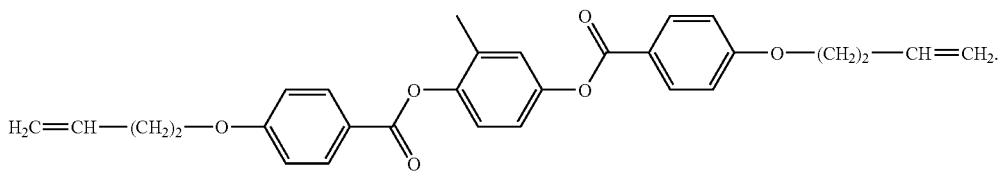

5. The shape memory main-chain smectic-C elastomer of claim 4, wherein the reaction mixture comprises about 1 to about 99 weight percent of the first liquid crystalline diene and about 1 to about 99 weight percent of the second liquid crystalline diene, based on the total weight of the first liquid crystalline diene and the second liquid crystalline diene.

6. The shape memory main-chain smectic-C elastomer of claim 1, wherein the polyvinyl crosslinking agent is selected from tetrakis(vinyldimethylsiloxy)silane, tris(vinyldimethylsilyloxy)methylsilane, bis(vinyldimethylsilyl)benzene, and combinations thereof.

7. The shape memory main-chain smectic-C elastomer of claim 1, wherein the polyvinyl crosslinking agent is tetrakis (vinyldimethylsiloxy)silane.

8. The shape memory main-chain smectic-C elastomer of claim 1, wherein the reaction mixture comprises the polyvinyl crosslinking agent in an amount of about 2 to about 30 mole percent, based on moles of the liquid crystalline diene.

9. The shape memory main-chain smectic-C elastomer of claim 1, wherein the bis(silyl hydride) compound is selected from 1,4-bis(dimethylsilyl)benzene, silyl hydride-terminated amorphous polymers having a glass transition temperature less than or equal to 0° C., and hydride-terminated poly(dimethylsiloxane)s having the structure

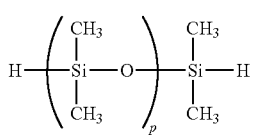

wherein p is 1 to about 12.

10. The shape memory main-chain smectic-C elastomer of claim 9, wherein the bis(silyl hydride) compound is the hydride-terminated poly(dimethylsiloxane) wherein p is 7.

11. The shape memory main-chain smectic-C elastomer of claim 1, wherein the mole ratio of hydride functionality in the bis(silyl hydride) compound to total vinyl functionality in the liquid crystalline diene and the crosslinking agent is about 0.9 to about 1.10.

12. The shape memory main-chain smectic-C elastomer of claim 1, wherein the liquid crystalline diene comprises 1,4-bis[4-(4-pentenyloxy)benzoyl]hydroquinone and 2-tert-butyl-1,4-bis[4-(4-pentenyloxy)benzoyl]-hydroquinone; wherein the crosslinking agent is tetrakis(vinyldimethylsiloxy)silane; and wherein the bis(silyl hydride) compound has the structure

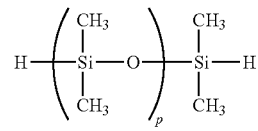

wherein p is 7.

13. The shape memory main-chain smectic-C elastomer of claim 12, exhibiting a one-way shape memory effect.

14. The shape memory main-chain smectic-C elastomer of claim 1, wherein the liquid crystalline diene comprises 2-methyl-1,4-bis[4-(4-pentenyloxy)benzoyl]-hydroquinone and 2-methyl-1,4-bis[4-(4-butenyloxy)benzoyl]-hydroquinone; wherein the crosslinking agent is tetrakis(vinyldimethylsiloxy)silane; and wherein the bis(silyl hydride) compound has the structure

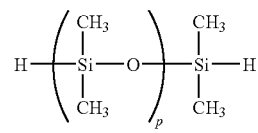

wherein p is 7.

15. The shape memory main-chain smectic-C elastomer of claim 14, exhibiting a two-way shape memory effect.

16. The shape memory main-chain smectic-C elastomer of claim 1, exhibiting a glass transition temperature of about −60 to about 50° C. at one atmosphere.

17. The shape memory main-chain smectic-C elastomer of claim 1, exhibiting a glass transition temperature of about −40 to about 50° C. at one atmosphere.

18. The shape memory main-chain smectic-C elastomer of claim 1, exhibiting a smectic-isotropic transition temperature of about 5 to about 70° C. at one atmosphere.

19. The shape memory main-chain smectic-C elastomer of claim 1, exhibiting a glass transition temperature and having a tensile modulus of about 0.1 to about 10 megaPascals at a temperature below the glass transition temperature.

20. The shape memory main-chain smectic-C elastomer of claim 1, exhibiting a tensile modulus of at least 4 megaPascals at 20° C. and one atmosphere, and a tensile modulus of less than or equal to 0.2 megaPascal at 40° C. and one atmosphere.

21. A shape memory main-chain smectic-C elastomer, consisting of the hydrosilylation product of a reaction mixture comprising:
(a) a liquid crystalline diene having the structure

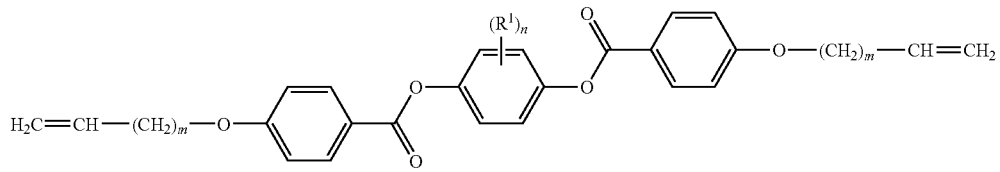

wherein each occurrence of $R^1$ is independently selected from $C_2$-$C_{12}$ hydrocarbyl, $C_1$-$C_{12}$ hydrocarbyloxy, unsubstituted or substituted phenoxy, unsubstituted or substituted thiophenoxy, unsubstituted or substituted benzyl, unsubstituted or substituted benzoyl, unsubstituted or substituted phenyl sulfonyl, and unsubstituted or substituted phenyl sulfinyl; wherein each occurrence of m is 1 to about 10; and wherein n is 0 to 4;
(b) a crosslinking agent selected from polyvinyl crosslinking agents and poly(silyl hydride) crosslinking agents; and
(c) a bis(silyl hydride) compound.

22. The shape memory main-chain smectic-C elastomer of claim 21, wherein the crosslinking agent is a poly(silyl hydride) crosslinking agent selected from tris(dimethylsilyloxy)methylsilane, tetrakis(dimethylsilyloxy)silane, 2,4,6,8-tetramethylcyclotetrasiloxane, 2,4,6,8,10-pentamethylcyclopentasiloxane, and combinations thereof.

23. A method of preparing a shape memory main-chain smectic-C elastomer, comprising:
catalyzing a hydrosilylation reaction in a reaction mixture comprising
(a) a liquid crystalline diene having the structure

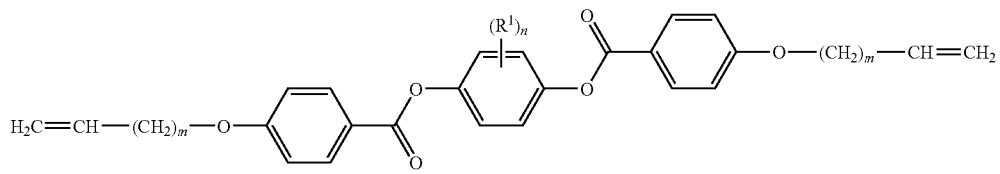

wherein each occurrence of $R^1$ is independently selected from $C_1$-$C_{12}$ hydrocarbyl, $C_1$-$C_{12}$ hydrocarbyloxy, unsubstituted or substituted phenoxy, unsubstituted or substituted thiophenoxy, unsubstituted or substituted benzyl, unsubstituted or substituted benzoyl, unsubstituted or substituted phenyl sulfonyl, and unsubstituted or substituted phenyl sulfinyl; wherein each occurrence of m is 1 to about 10; and wherein n is 0 to 4;
(b) a polyvinyl crosslinking agent; and
(c) a bis(silyl hydride) compound;
to form the shape memory main-chain smectic-C elastomer.

24. The method of claim 23, wherein the liquid crystalline diene comprises 1,4-bis[4-(4-pentenyloxy)benzoyl]hydroquinone and 2-tert-butyl-1,4-bis[4-(4-pentenyloxy)benzoyl]-hydroquinone; wherein the crosslinking agent is tetrakis(vinyldimethylsiloxy)silane; and wherein the bis(silyl hydride) compound has the structure

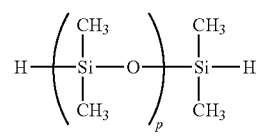

wherein p is 7.

25. The method of claim 23, wherein the liquid crystalline diene comprises 2-methyl-1,4-bis[4-(4-pentenyloxy)benzoyl]-hydroquinone and 2-methyl-1,4-bis[4-(4-butenyloxy)benzoyl]-hydroquinone; wherein the crosslinking agent is tetrakis(vinyldimethylsiloxy)silane; and wherein the bis(silyl hydride) compound has the structure

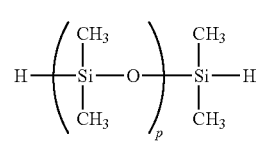

wherein p is 7.

26. A composition comprising the shape memory main-chain smectic-C elastomer of claim 1.

27. The composition of claim 26, further comprising an additive selected from liquid crystalline diluents, rubbers comprising crosslinkable functionality, reinforcing fillers, conductive fillers, heat stabilizers, light-absorbing dyes, and combinations thereof.

28. A pressure-sensitive adhesive comprising the shape memory main-chain smectic-C elastomer of claim 1.

29. An article comprising the shape memory main-chain smectic-C elastomer of claim 1.

30. The article of claim 29, wherein the article is a product for non-invasive medical applications.

31. The article of claim 29, wherein the article is an optical element selected from the group consisting of lenses and shutters, wherein the lenses and shutter have applied thereon an optically transparent coating of the shape memory main-chain smectic-C elastomers.

32. The article of claim 29, wherein the article is an implantable medical device.

33. The article of claim 29, wherein the article is an implantable intraocular lens.

34. The article of claim 29, wherein the article is a shape memory contact lens.

35. The article of claim 29, wherein the article is a shape memory Fresnel lens.

36. A reversible embossing medium comprising the shape memory main chain smectic-C elastomer of claim 1.

* * * * *